US011450029B2

(12) United States Patent  
Nakao et al.

(10) Patent No.: US 11,450,029 B2  
(45) Date of Patent: Sep. 20, 2022

(54) VEHICLE IMAGE PROCESSING DEVICE, VEHICLE IMAGE PROCESSING METHOD, PROGRAM AND STORAGE MEDIUM

(71) Applicant: MITSUBISHI HEAVY INDUSTRIES, LTD., Tokyo (JP)

(72) Inventors: Kenta Nakao, Tokyo (JP); Kiichi Sugimoto, Tokyo (JP); Tomohiro Matsumoto, Tokyo (JP); Kensuke Futahashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 464 days.

(21) Appl. No.: 16/595,701

(22) Filed: Oct. 8, 2019

(65) Prior Publication Data

US 2020/0118294 A1   Apr. 16, 2020

(30) Foreign Application Priority Data

Oct. 15, 2018   (JP) .............................. JP2018-194136

(51) Int. Cl.
  *G06T 7/80* (2017.01)
  *G06T 1/20* (2006.01)
  *B60R 11/04* (2006.01)

(52) U.S. Cl.
  CPC ................ *G06T 7/80* (2017.01); *B60R 11/04* (2013.01); *G06T 1/20* (2013.01); *B60R 2300/105* (2013.01); *B60R 2300/302* (2013.01); *G06T 2207/30252* (2013.01)

(58) Field of Classification Search
  CPC ... G06T 7/80; G06T 1/20; G06T 2207/30252; B60R 11/04; B60R 2300/105; B60R 2300/302
  See application file for complete search history.

(56) References Cited

U.S. PATENT DOCUMENTS

| 2006/0197761 | A1* | 9/2006 | Suzuki | ................... | H04N 7/181 |
| | | | | | 348/E7.086 |
| 2013/0088578 | A1* | 4/2013 | Umezawa | .............. | G08G 1/166 |
| | | | | | 348/47 |
| 2017/0132476 | A1* | 5/2017 | Chien | ..................... | G06T 5/005 |
| 2017/0237882 | A1* | 8/2017 | Shiohara | ................. | G09G 5/00 |
| | | | | | 348/148 |
| 2018/0314921 | A1* | 11/2018 | Mercep | ................ | G06K 9/6289 |

FOREIGN PATENT DOCUMENTS

| JP | 2013-93013 A | 5/2013 |
| JP | 2015-210584 A | 11/2015 |
| JP | 2018-95067 A | 6/2018 |

* cited by examiner

*Primary Examiner* — Kenny A Cese  
(74) *Attorney, Agent, or Firm* — Birch, Stewart, Kolasch & Birch, LLP

(57) ABSTRACT

A vehicle image processing device includes: a plurality of buffers configured to accumulate pieces of image data input individually and sequentially from a plurality of cameras installed in a vehicle so as to associate the pieces of image data with the cameras; a processor configured to select the buffer based on the state information of the vehicle and acquire the piece of image data from the selected buffer so as to perform image processing thereon; a signal line for transferring the pieces of image data in the buffers to the processor; and a transfer controller configured to output the piece of image data in the buffer required from the processor to the signal line.

18 Claims, 13 Drawing Sheets

VEHICLE IMAGE PROCESSING DEVICE, VEHICLE IMAGE PROCESSING METHOD, PROGRAM AND STORAGE MEDIUM

TECHNICAL FIELD

The present disclosure relates to ambient environment recognition which is performed with a plurality of cameras installed in a vehicle.

BACKGROUND

In recent years, a large number of technologies have been developed in which a plurality of cameras installed in a vehicle are used so as to perform ambient environment recognition on the vehicle and in which thus a brake is automatically applied to the vehicle depending on the situation, with the result that the driving assistance and the automated driving of vehicles proceed. In the technologies described above, since not only the present vehicle but also people therearound, other vehicles and the like are moved, with consideration given to feedback from the ambient environment recognition to control on alarms, braking and the like, images shot with the cameras need to be processed in real time. However, when a processor is provided in each of the cameras, the cost of the vehicle is significantly increased.

In order to solve such a problem, Patent Document 1 discloses that in a configuration in which a plurality of stereo cameras are individually connected to I/Os and in which a CPU (image processing IC) uses a RAM so as to perform, as necessary, image processing on image data shot, a situation judgment/image selection portion determines which one of the images shot with the stereo cameras is output to an image processing portion in accordance with a support mode, and that thus the image processing portion (a preprocessing portion and the subsequent portions) performs the image processing. In this way, it is possible to avoid the need to use a computation device whose processing capability is high and the like, and thus it is possible to reduce the cost.

Likewise, Patent Document 2 discloses that a CPU (computation portion) capable of performing front recognition processing for the image information of a front camera input to an input portion and rear recognition processing for the image information of a rear camera selects and performs processing executed as the front recognition processing and the rear recognition processing, respectively, based on the state information of the present vehicle (information indicating a forward movement and a backward movement and a travelling state). In this way, as compared with a case where CPUs are separately provided for the front recognition processing and the rear recognition processing, it is possible to simply its configuration.

Moreover, Patent Document 3 discloses that part of captured images obtained by imaging the ambient environment of a vehicle is selected as a target region according to conditions of the vehicle including the travelling environment and the travelling state of the vehicle, that image processing is performed on the selected target region and thus as compared with a case where image processing is performed on the entire captured images, a processing burden can be reduced.

CITATION LIST

Patent Literature

Patent Document 1: JP2013-93013A
Patent Document 2: JP2018-95067A
Patent Document 3: JP2015-210584A

SUMMARY

However, in Patent Document 1, in order for the image selection to be performed with the situation judgment/image selection portion, all the image data generated by shooting with the individual stereo cameras is temporarily input to the CPU. Hence, the CPU needs to perform processing for capturing all the image data in a stage preceding the image selection described above, and an operating time allocated to the image processing is reduced accordingly. Likewise, in Patent Document 2, the CPU receives inputs of all the image information of the front camera and the rear camera, performs correction processing (distortion correction) on all the image information which is input and thereafter performs the selection described above. Hence, the CPU needs to perform, for example, processing for capturing all the image data and processing on image information which is not selected, and thus an operating time allocated to the image processing is reduced accordingly. As described above, when the amount of processing performed by a processor for the image processing is increased, in order to process shot images in real time, the processor is required to have higher processing capability, with the result that it is likely that the cost of the vehicle cannot be sufficiently reduced.

In view of the foregoing situation, an object of at least one embodiment of the present invention is to provide a vehicle image processing device which can more rapidly perform, while reducing the cost of a vehicle, image processing on images shot with a plurality of cameras.

(1) A vehicle image processing device according to at least one embodiment of the present invention includes: a plurality of buffers configured to accumulate pieces of image data input individually and sequentially from a plurality of cameras installed in a vehicle so as to associate the pieces of image data with the cameras; a processor configured to select the buffer based on the state information of the vehicle and acquire the piece of image data from the selected buffer so as to perform image processing thereon; a signal line for transferring the pieces of image data in the buffers to the processor; and a transfer controller configured to output the piece of image data in the buffer required from the processor to the signal line.

In the configuration of (1) described above, the processor for the image processing does not perform any processing on the image data until the image data is transferred with the transfer controller from the buffer in which the image data shot with each of the cameras is stored, and performs the image processing on only the image data acquired by the transfer. In this way, it is possible to reduce the burden of the processor, and thus it is possible to allocate a larger amount of operating time to the image processing. Moreover, for example, the processor determines, from the image data of the individual cameras accumulated in the buffers, based on the state information of the vehicle such as the vehicle speed and shift position, the buffers which need to be set to the target for the image processing so as to narrow the cameras set to the target for the image processing to at least part thereof, and thus it is possible to reduce the number of pieces of image data which needs to be processed per unit time.

As described above, the processor for the image processing sets the image data of the cameras determined based on the state information of the vehicle to the target for the image processing, and does not perform processing until the image data set to the target is acquired, with the result that it is possible to more rapidly (more quickly) perform environment recognition (the detection of a person and an article) around the vehicle through the cameras. Hence, it is possible to avoid the provision of the processor for each of the cameras and the use of an expensive processor having more excellent processing capability, and thus it is possible to reduce the cost of the vehicle.

(2) In some embodiments, in the configuration of (1) described above, the processor determines, based on the state information, at least one buffer of the buffers as a selection target, and sets a selection frequency of the at least one buffer included in the selection target higher than selection frequencies of the other buffers so as to sequentially select the at least one buffer included in the selection target.

In the configuration of (2) described above, the processor determines, from the cameras, one or more cameras (one or more buffers) which are set to the target for the image processing, sequentially acquires the image data from the one or more buffers corresponding to the one or more cameras determined so as to perform the image processing and thereby performs the image processing on a predetermined number of pieces of image data per unit time. As described above, the cameras which are set to the target for the image processing are narrowed to at least part of the cameras, and thus it is possible to reduce the number of pieces of image data which need to be processed per unit time, with the result that it is possible to perform environment recognition (detection of movement of a person and an article) around the vehicle through the cameras in a satisfactory real-time manner.

(3) In some embodiments, in the configuration of (1) and (2) described above, the vehicle image processing device further includes: a capture unit having the buffers and the transfer controller provided therein; a work buffer configured to hold the piece of image data output by the transfer controller to the signal line and subjected to the image processing performed by the processor; and a processor unit having the processor and the work buffer provided therein, and the signal line is configured to be able to connect the buffers in the capture unit and the work buffer in the processor unit to each other.

In the configuration of (3) described above, the pieces of image data of the individual cameras managed with the buffers are passed through the signal line for connecting the capture unit and the processor unit, are transferred to the work buffer provided in the processor unit and are subjected to the image processing in the processor. The management and the transfer processing of the buffers in the capture unit is separated with the image processing in the processor unit in terms of hardware in this way, and thus as described above, it is possible to perform environment recognition (the detection of a person and an article) around the vehicle through the cameras in a satisfactory real-time manner.

(4) In some embodiments, in the configuration of (1) to (3) described above, the state information includes a vehicle speed, and the processor performs the selection of the buffer based on the comparison of the vehicle speed and threshold values.

In general, there is an upper limit on the number of pieces of image data on which a processor can perform image processing per unit time. Hence, when the pieces of image data of the cameras are sequentially processed, as the number of cameras (buffers) is increased, the number of pieces of image data per camera subjected to image processing at a unit time is decreased. As this number is decreased, a longer delay occurs in the image processing on the pieces of image data which are sequentially fed from each of the cameras, and thus a time lag in the environment recognition through the image processing of the cameras is increased.

In the configuration of (4) described above, based on the comparison of the vehicle speed and the threshold values, the processor makes a selection such as by determining the buffers which are set to the target for the image processing. As the vehicle speed is increased, the time lag in the environment recognition through the image processing is more likely to be fatal whereas as the vehicle speed is decreased, the time lag is more likely to serve as an allowable range. Hence, as the vehicle speed is decreased, even when a larger number of cameras are set to the target for the image processing, it is possible to appropriately perform driving assistance for the vehicle. Therefore, the cameras which are set to the target for the image processing are selected by the relationship with the vehicle speed, and thus even the processor whose processing capability is relatively low can appropriately perform the driving assistance for the vehicle through the environment recognition using the cameras in a satisfactory real-time manner.

(5) In some embodiments, in the configuration of (4) described above, the cameras include one or more of the cameras for shooting the surrounding of the vehicle, the threshold values include a first threshold value and when the vehicle speed is less than the first threshold value, the processor selects the buffer in which the piece of image data shot with the one or more of the cameras for shooting the entire surrounding of the vehicle is accumulated.

For example, when the vehicle is stopped before being moved or in a state (state where travelling is started) where the vehicle is moved at a very low speed due to a creep phenomenon or the like, the vehicle can be moved to various positions depending on a steering angle. Hence, with the near-field cameras which have a relatively wide angle of view so as to be able to appropriately shoot a near field or the like, it is necessary to monitor the entire surrounding of the present vehicle (at least the entire orientation in a horizontal direction).

In the configuration of (5) described above, when the state (state where travelling is started) as described above is detected with the first threshold value, the processor sets images shot with one or more of the cameras (such as one or more of the near-field cameras) necessary for obtaining images around the vehicle (the entire orientation) to the target for the image processing. In this way, it is possible to appropriately perform driving assistance corresponding to conditions of the vehicle through monitoring with the cameras in a satisfactory real-time manner.

For example, when the cameras such as a total of four cameras for shooting the front, the back, the left and the right of the vehicle are installed in order to obtain the entire surrounding, the number of cameras set to the target for the image processing is more likely to be increased. Hence, when the images of the cameras are sequentially switched one by one, and then the image processing is performed, as the number of cameras is increased, the processing cycle of the image data in the individual cameras (individual buffers) is prolonged. However, since the vehicle is moved at a very low speed, as long as the image processing is allowed (is not problematic) as the driving assistance for the vehicle, the image processing can be performed on the images shot with the individual cameras.

(6) In some embodiments, in the configuration of (4) and (5) described above, the cameras include a camera for shooting an area ahead of the vehicle and a camera for shooting an area behind the vehicle, the state information further includes a shift position of a gear of the vehicle, the threshold values include the first threshold value and a second threshold value which is more than the first threshold value and when the vehicle speed is equal to or more than the first threshold value and less than the second threshold value, and the shift position indicates a forward movement, the processor selects only the buffer in which the piece of image data shot with the camera for shooting the area ahead of the vehicle is accumulated whereas when the shift position indicates a backward movement, the processor selects only the buffer in which the piece of image data shot with the camera for shooting the area behind the vehicle is accumulated.

For example, in a state (low-speed travelling state) where the vehicle can be rapidly moved in a lateral direction with respect to the direction of travelling depending on the steering angle, it is necessary to use the near-field cameras (described above) and the like so as to extensively monitor an area in the direction of travelling of the present vehicle.

In the configuration of (6) described above, when the state (low-speed travelling state) as described above is detected with the first threshold value and the second threshold value, the processor sets images shot with the cameras for shooting images in the direction of travelling of the vehicle to the target for the image processing. In this way, it is possible to appropriately perform driving assistance corresponding to conditions of the vehicle through monitoring with the cameras in a satisfactory real-time manner.

(7) In some embodiments, in the configuration of (4) to (6) described above, the cameras include a far-field camera which shoots a far-field area in the direction of travelling of the vehicle and a near-field camera which shoots a near-field area in the direction of travelling of the vehicle and which has a wider angle of view than the far-field camera, the threshold values include the second threshold value and when the vehicle speed is equal to or more than the second threshold value, the processor selects the buffer in which the piece of image data shot with the far-field camera is accumulated whereas when the vehicle speed is less than the second threshold value, the processor selects the buffer in which the piece of image data shot with the near-field camera is accumulated.

In a travelling state where the vehicle speed is relatively so high that the vehicle cannot be rapidly turned in direction by steering, the time allowed for feedback (for example, automatic braking in the vehicle or a warning for the driver) from the environment recognition (the detection of a person and an article) through the image processing to the driver of the vehicle or the like is more shortened. Hence, it is necessary to monitor a distant area from the vehicle is monitored so as to detect a target (a person and an article) in a distant area in an earlier stage.

In the configuration of (7) described above, when the travelling state as described above is detected with the second threshold value, the processor sets images shot with the far-field cameras for shooting a distant area in the direction of travelling of the vehicle to the target for the image processing. As described above, for example, images shot with a smaller number of cameras such as one camera are set to the target for the image processing, and thus it is possible to appropriately perform driving assistance corresponding to conditions of the vehicle through monitoring with the cameras in a satisfactory real-time manner.

(8) In some embodiments, in the configuration of (4) to (7) described above, the threshold values include a switching start threshold value and a switching completion threshold value in which a difference with the switching start threshold value is a first value, the processor is configured to perform the image processing on a predetermined number of pieces of the image data per unit time and when the vehicle speed is between the switching start threshold value and the switching completion threshold value, the processor switches the buffers to be selected such that, as the vehicle speed approaches the switching completion threshold value from the switching start threshold value, the predetermined number of pieces of image data on which the image processing is performed per the unit time before the vehicle speed reaches the switching start threshold value is replaced with the predetermined number of pieces of image data after the vehicle speed reaches the switching completion threshold value.

When the cameras (buffers) which are set to the target for the image processing are exactly switched at a predetermined threshold value, for example, if the vehicle speed obtained from the vehicle includes an error, appropriate buffers corresponding to the vehicle speed are not selected around the threshold value, with the result that it is likely that the appropriate environment recognition is not performed.

In the configuration of (8) described above, the cameras (buffers) which are set to the target for the image processing of the processor are gradually switched from the preceding stage so as to be completely switched at the predetermined threshold values (such as the first threshold value and the second threshold value described above). In this way, even when the vehicle speed obtained from the vehicle has an error, the ambient environment recognition on the vehicle can be appropriately performed.

(9) In some embodiments, in the configuration of (8) described above, when the vehicle speed reaches the switching start threshold value, the processor first switches the camera corresponding to the buffer which needs to be selected when the vehicle speed reaches the switching completion threshold value and the buffer corresponding to the camera which is least associated with a direction of shooting.

In the configuration of (9) described above, even when the vehicle speed obtained from the vehicle has an error, the ambient environment recognition on the vehicle can be appropriately performed.

(10) In some embodiments, in the configuration of (1) to (9) described above, the vehicle image processing device further includes: an acquisition portion acquiring characteristic information including an instruction for the monitoring direction in a specific place, and the processor selects the buffers based on the position of travelling and the characteristic information.

In the configuration of (10) described above, the processor sets the image data of the camera for shooting the area in the monitoring direction indicated by the characteristic information to the target for the image processing. Although in the vehicle which travels in various places, it may be necessary to monitor the specific direction in a focused manner such as a place in which accidents often occur, the cameras which are set to the target for the image processing are switched based on the characteristic information, and thus it is possible to perform the driving assistance which is safer.

(11) In some embodiments, in the configuration of (1) to (10) described above, the vehicle is an industrial vehicle, the state information includes the vehicle speed and the steering angle, the processor determines, based on the state information, whether turning of the vehicle is rightward turning or leftward turning and when the vehicle is turned rightward, the processor selects the buffer in which the piece of image data obtained by shooting at least an area on a right side in a forward direction and an area on a left side in a backward direction with respect to the direction of travelling is accumulated whereas when the vehicle is turned leftward, the processor selects the buffer in which the piece of image data obtained by shooting at least an area on the left side in the forward direction and an area on the right side in the backward direction with respect to the direction of travelling is accumulated.

For example, since an industrial vehicle such as a forklift has a short wheel base and a large steering angle, it is necessary to pay sufficient attention to the lateral direction as compared with the forward direction with respect to the direction of travelling when travelling is started in a state where a steering wheel is turned. Specifically, it is necessary to simultaneously monitor not only the right side in the forward direction with respect to the direction of travelling but also the left side in the backward direction with respect thereto at the time of rightward turning and not only the left side in the forward direction with respect to the direction of travelling but also the right side in the backward direction with respect thereto at the time of leftward turning.

In the configuration of (11) described above, the processor determines the direction of turning based on the vehicle speed and the steering angle, and selects, based on the result of the determination, the cameras which are set to the target for the image processing. As described above, according to the direction of turning (steering angle) of the vehicle, the image data of not only one side such as the right side but also the opposite side (left side) is set to the target for the image processing, and thus at the time of lateral turning, while attention is being paid to the direction opposite to the direction of travelling, for example, the detection of a person and an article is performed, with the result that it is possible to perform the driving assistance which is safer.

(12) In some embodiments, in the configuration of (11) described above, the cameras include a right-side shooting camera for shooting an area on the right side of the vehicle and a left-side shooting camera for shooting an area on the left side thereof, and when the vehicle is turned rightward, the processor performs the image processing on the region of part on a left side of the pieces of image data individually shot with the right-side shooting camera and the left-side shooting camera whereas when the vehicle is turned leftward, the processor performs the image processing on the region of part on a right side of the pieces of image data individually shot with the right-side shooting camera and the left-side shooting camera.

According to the direction of turning (steering angle) of the vehicle, the image data of not only one side such as the right side but also the opposite side (left side) is set to the target for the image processing, and thus the number of cameras set to the target for the image processing is increased, with the result that the frequency at which the image processing is performed with the processor on the image data accumulated in each of the buffers (cameras) is decreased (the cycle is decreased).

In the configuration of (12) described above, the processor performs the image processing on the region of part of each piece of image data acquired when the vehicle is turned. For example, according to the steering angle, the camera on the right side at the time of rightward turning processes the region (the left side of the image) of only the front side of the vehicle, and the camera on the left side processes the region (the left side of the image) of only the back side of the vehicle in a limited manner, that is, the image processing is performed on only the regions of parts, with the result that it is possible to reduce the prolongation of the acquisition cycle of the image data from each of the buffers. In this way, even when the number of cameras is increased, it is possible to perform driving assistance which is safer in a satisfactory real-time manner.

(13) In some embodiments, in the configuration of (1) to (12) described above, the state information includes the steering angle and the shift position of the gear of the vehicle, and the processor performs, based on the steering angle and the shift position the image processing on a region of part included in the pieces of image data acquired from the buffers.

In the configuration of (13) described above, based on the steering angle and the shift position, part of each piece of image data is extracted so as to be set to the target for the image processing. In this way, in each piece of image data, the image processing on the partial region which does not include the travelling route of the vehicle predicted based on the steering angle and the shift position can be omitted. Hence, it is possible to reduce the burden of the image processing on each piece of image data, and thus it is possible to increase the number of pieces of image data on which the image processing can be performed per unit time. Consequently, it is possible to cope with a performance time which is required in a high vehicle speed or the like.

(14) In some embodiments, in the configuration of (1) to (13) described above, the cameras include a first camera for shooting an area in a first direction of the vehicle and a second camera for shooting an area in a direction different from the first direction, and the vehicle image processing device further includes an adjustment portion adjusting, based on the brightness of the pieces of image data individually shot with the first camera and the second camera, the shooting parameter for each of the cameras.

In the configuration of (14) described above, the frontlight and backlight of the cameras which are set to the target for the image processing are detected such that the shooting parameters for the cameras are adjusted, and thus it is possible to minimize influence caused by variations in brightness produced by sunlight, with the result that it is possible to perform stable environment recognition.

(15) A vehicle image processing method according to at least one embodiment of the present invention is performed by a processor of a computer, the computer includes: a plurality of buffers configured to accumulate pieces of image data input individually and sequentially from a plurality of cameras installed in a vehicle so as to associate the pieces of image data with the cameras; the processor configured to select the buffer based on the state information of the vehicle including a vehicle speed and acquire the piece of image data from the selected buffer so as to perform image processing thereon; a signal line for transferring the pieces of image data in the buffers to the processor; and a transfer controller configured to output the piece of image data in the buffer required from the processor to the signal line and the vehicle image processing method include a step of performing the selection of the buffer based on comparison of the vehicle speed and threshold values.

In the configuration of (15) described above, the same effects as in (1) described above are achieved.

(16) A vehicle image processing program according to at least one embodiment of the present invention instructs a processor of a computer to perform a step of performing the selection of a buffer based on the comparison of a vehicle speed and threshold values, and the computer includes: a plurality of buffers configured to accumulate pieces of image data input individually and sequentially from a plurality of cameras installed in a vehicle so as to associate the pieces of image data with the cameras; the processor configured to select the buffer based on state information of the vehicle including the vehicle speed and acquire the piece of image data from the selected buffer so as to perform image processing thereon; a signal line for transferring the pieces of image data in the buffers to the processor; and a transfer controller configured to output the piece of image data in the buffer required from the processor to the signal line.

In the configuration of (16) described above, the same effects as in (1) described above are achieved.

(17) A storage medium according to at least one embodiment of the present invention is a computer-readable storage medium storing the vehicle image processing program discussed in (16) described above.

In the configuration of (17) described above, the vehicle image processing program stored in the storage medium is executed, and thus the same effects as in (1) described above are achieved.

According to at least one embodiment of the present invention, a vehicle image processing device is provided which can more rapidly perform, while reducing the cost of a vehicle, image processing on images shot with a plurality of cameras.

DETAILED DESCRIPTION

Some embodiments of the present invention will be described below with reference to accompanying drawings. However, the dimensions, the materials, the shapes, the relative arrangements and the like of constituent components which are described as embodiments or shown in drawings are not intended to limit the scope of the present invention but are simply examples of description.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
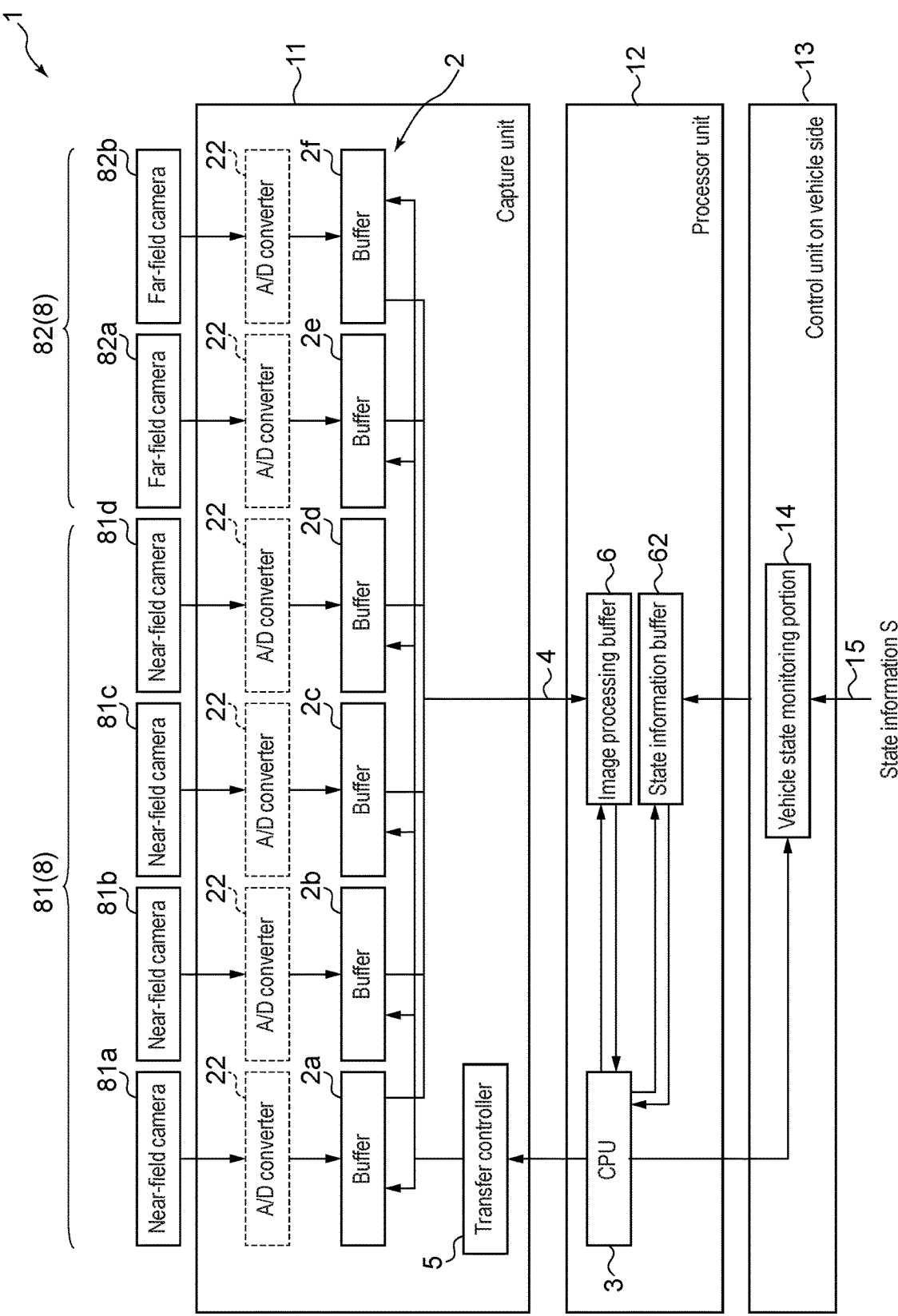
FIG. 1 is a diagram schematically showing the hardware configuration of a vehicle image processing device according to an embodiment of the present invention.
Figure 2:
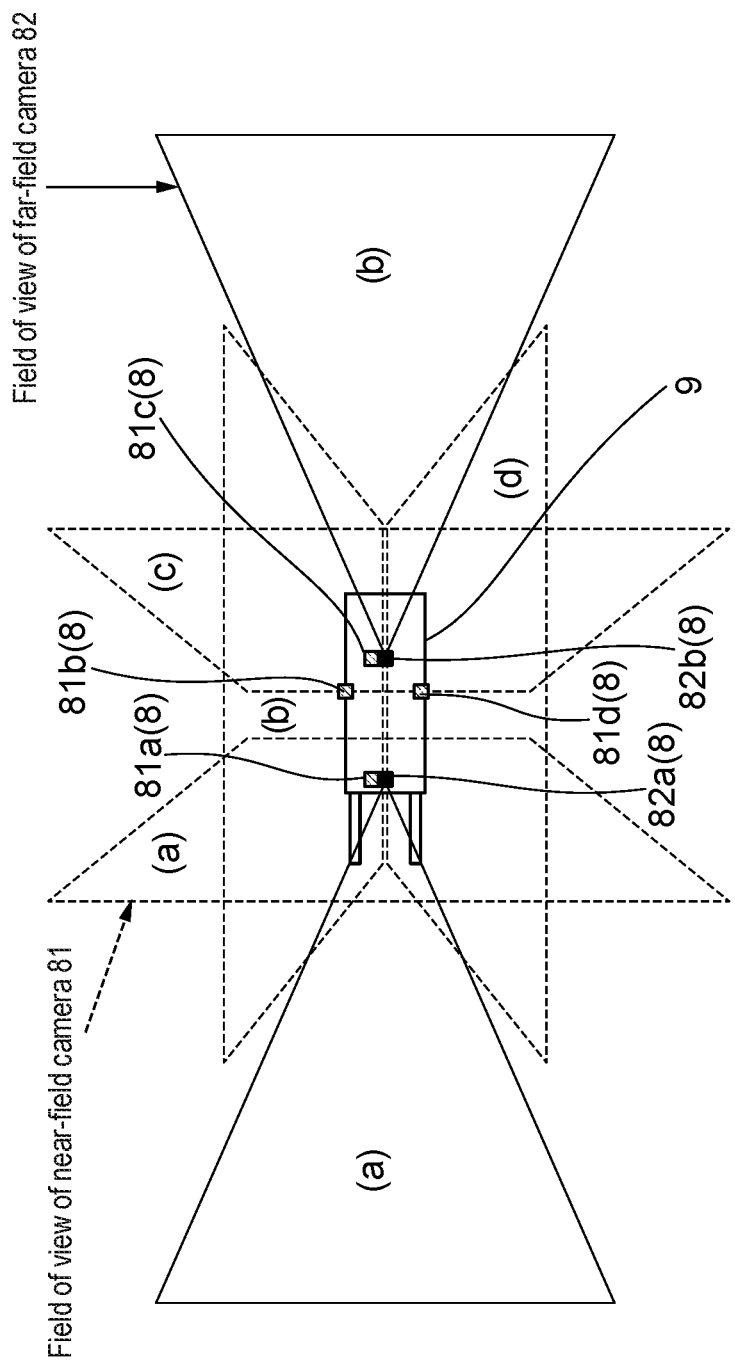
FIG. 2 is a diagram showing an example of installation of a plurality of cameras in a vehicle in the embodiment of the present invention.
Figure 3:
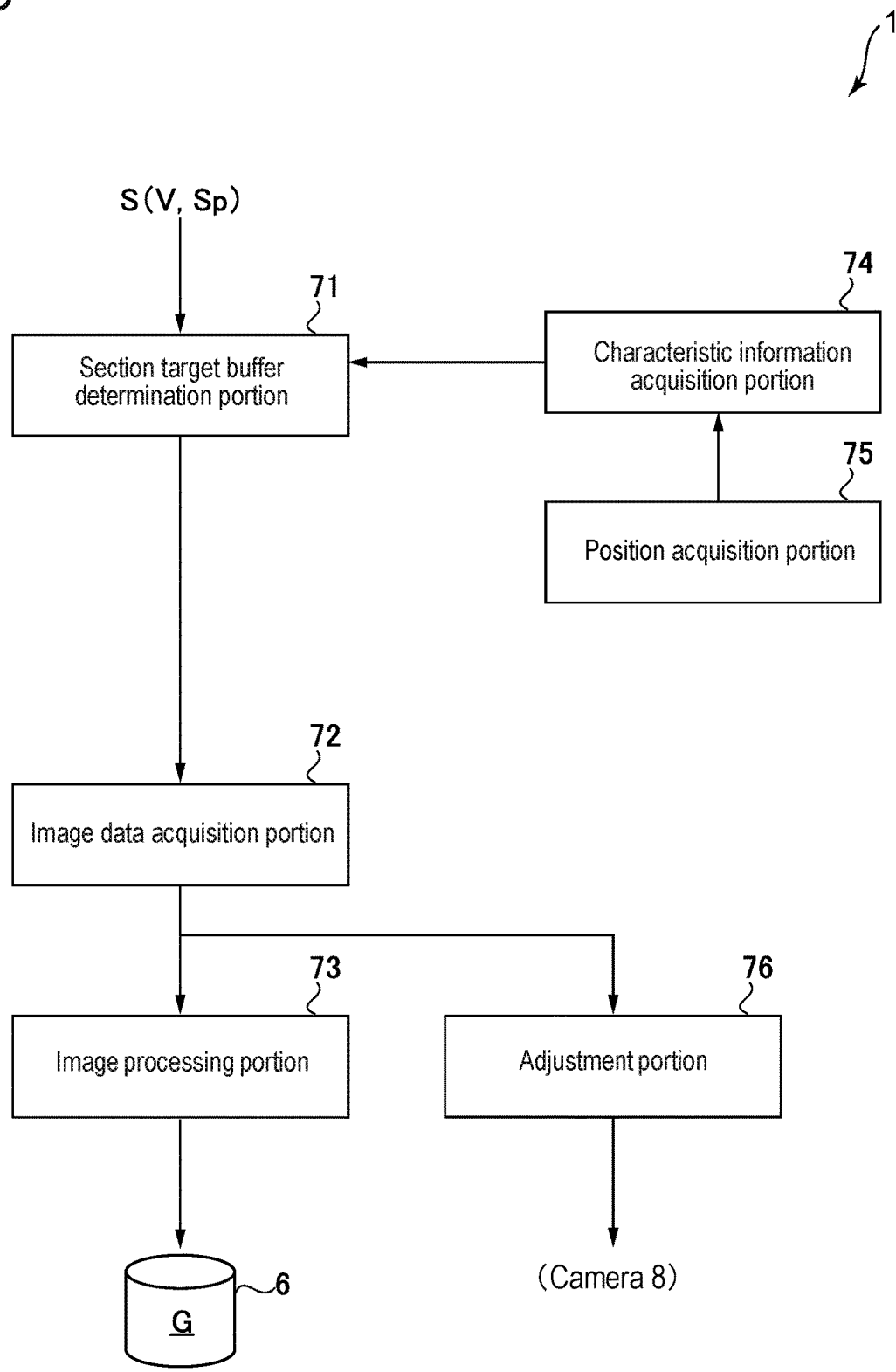
FIG. 3 is a diagram showing the functional blocks of the vehicle image processing device according to the embodiment of the present invention.

FIG. 1 is a diagram schematically showing the hardware configuration of a vehicle image processing device 1 according to an embodiment of the present invention. FIG. 2 is a diagram showing an example of installation of a plurality of cameras 8 in a vehicle 9 in the embodiment of the present invention. FIG. 3 is a diagram showing the functional blocks of the vehicle image processing device 1 according to the embodiment of the present invention.

The vehicle image processing device 1 (hereinafter the image processing device 1 as necessary) is a device for performing image processing on images (image data G) individually shot with a plurality of cameras 8 installed (incorporated) in the vehicle 9 which is a general automobile or an industrial vehicle such as a forklift. As shown in FIG. 1, in the image processing device 1, the cameras 8 are individually connected with separate wires or the like, and the images shot with the individual cameras 8 are input to the image processing device 1. The number of cameras 8 is arbitrary, and is preferably determined according to the purpose thereof and the specifications (such as an angle of view and a distance capable of performing shooting) of the cameras. In the individual cameras 8, images shot with the cameras 8 are continuously input to the image processing device 1.

In the embodiment shown in FIGS. 1 and 2, each of the cameras 8 generates a predetermined number of images per second. In the present embodiment, as shown in FIG. 2, a total of six cameras 8 are installed in the vehicle 9, and the individual cameras are installed so as to shoot in the direction of circumference of the vehicle 9. More specifically, four out of the six cameras 8 are near-field cameras 81 for near-field shooting, and the two cameras are far-field cameras 82 for far-field shooting. The near-field camera 81 has a wider angle of view (viewing angle) than the far-field cameras so as to be able to appropriately shoot a relatively near field. Conversely, the far-field camera 82 has a narrower angle of view than the near-field camera 81 so as to be able to appropriately shoot a relatively far field. Hence, the four near-field cameras 81 are separately installed in four places of the front, the back, the left and the right of the vehicle 9 so as to fully shoot the entire circumference of the vehicle 9 with the four near-field cameras 81. The two far-field cameras 82 are separately installed in two places of the front (front where a driver's sheet is present) and the back (rear) of the vehicle 9 so as to shoot distant areas in forward and backward directions.

In order to process, in real time, the shot images which are sequentially input from the cameras 8 installed in the vehicle 9 as described above, as shown in FIG. 1, the image processing device 1 includes a plurality of buffers 2, a processor 3, a signal line 4 and a transfer controller 5.

The configurations thereof will be individually described.

The buffers 2 are storage portions which are configured so as to accumulate pieces of image data G that are individually and sequentially input from the cameras 8 installed in the vehicle 9 for each of the cameras 8. As shown in FIG. 1, a dedicated buffer 2 is provided for each of the cameras 8, and thus the image data G is managed (stored) for each of the cameras 8. In the embodiment shown in FIG. 1, each of the buffers 2 is a queue (FIFO), and thus the pieces of image data G are taken out in an order in which the pieces of image data G are input to the buffers 2. Each of the buffers 2 may have a ring buffer structure. Each of the buffers 2 may be set to have such a capacity as to be able to store only a small number of pieces of image data G, and a memory which has a smaller capacity is used such that the cost can be reduced. In the embodiment shown in FIG. 1, an A/D converter 22 converts the analog information of the shot image from each of the cameras 8 into digital information, and thus the image data G is accumulated in each of the buffers 2. The transfer controller 5 which will be described later manages the individual buffers 2 so as to accumulate (store) the image data G in the individual buffers 2.

The processor 3 selects the buffer 2 among the buffers 2 described above based on, for example, the state information S of the vehicle 9 such as a vehicle speed V and a shift position Sp and acquires the image data G from the selected buffer so as to perform the image processing. Specifically, each processor 3 is operated (such as the computation of data) according to the command of a program (image processing program) loaded on a main storage device so as to sequentially acquire the image data G from any one of the buffers 2 and to perform the image processing (such as the detection of a person and an article) on the image data G which is acquired. As shown in FIG. 1, the number of processors 3 is less than the number of buffers 2 in order to reduce the cost of the vehicle 9. In the embodiment shown in FIG. 1, the processor 3 included in the image processing device 1 has one CPU shown in the figure.

More specifically, the processor 3 is operated according to the image processing program which has a function shown in FIG. 3 so as to determine at least one of the buffers 2 as a selection target among the buffers 2 based on the state information S of the vehicle 9, and sets the selection frequencies of the buffers 2 included in the selection target higher than the selection frequencies of the other buffers 2 excluded in the selection target so as to sequentially select one or more of the buffers 2 included in the selection target. Specifically, for example, by setting the selection frequencies of the buffers 2 excluded in the selection target to a significantly low frequency such as zero, they may be prevented from being selected by the processor 3. In the embodiment shown in FIG. 3, the image processing program instructs a computer to realize: a selection target buffer determination portion 71 which determines the buffers 2 of the selection target; an image data acquisition portion 72 which sequentially selects one or more of the buffers 2 determined and included in the selection target and which acquires the image data G of the selected buffers 2; and an image processing portion 73 which performs the image processing on the acquired image data G.

In general, since the number of pieces of image data G on which one processor 3 can perform the image processing per unit time is limited, when the image data G from all the cameras 8 is monitored in real time, for example, a processor 3 which has excellent processing capability needs to be provided or the processor 3 needs to be provided for each of the cameras 8. However, in general, priority (importance) is present in the direction which needs to be monitored according to travelling conditions, and for example, the necessity to monitor the direction opposite to the direction of travelling is low at the time of travelling. Hence, each time the travelling conditions of the vehicle 9 are determined based on the state information S of the vehicle 9, the cameras 8 which need to be set to the target for the image processing are limited to at least part of the cameras 8 installed in the vehicle 9 according to the details of driving assistance which is performed, with the result that the processor 3 is made to perform the image processing. In this way, even when a plurality of buffers 2 are included in the selection target, since the number of buffers 2 which are set to the target for the image processing is minimized, the frequency at which the processor 3 acquires the image data G is increased for each of the buffers 2 (the cycle in which the image processing is performed is shortened), with the result that environment recognition using the cameras 8 can be performed in real time.

The signal line 4 is a transfer path for transferring the image data G in each of the buffers 2 described above to the processor 3. The signal line 4 may be configured so as to serially transfer the image data G or may be configured so as to parallel transfer the image data G. Hence, the image data G in each of the buffers 2 is passed through the signal line 4 so as to be transferred to the processor 3.

The transfer controller 5 can communicate with the processor 3 for image processing described above, manages the accumulation of the image data G in the buffers 2 and outputs the image data G required from the processor 3 to the signal line 4. In other words, the transfer controller 5 appropriately stores the image data G in each of the buffers 2 while managing the communication with the cameras 8 and memory addresses so as to appropriately store the communicated image data G in each of the buffers 2. As described above, the processor 3 determines the buffers 2 which are set to the selection target based on the state information S of the vehicle 9, and each time the processor 3 sequentially selects the buffer 2 therein, the image data G of the selected buffer 2 is acquired. Here, when the processor 3 specifies the buffer 2 to be acquired to the transfer controller 5 so as to require the image data G, the transfer controller 5 outputs the image data G of the required buffer 2 to the signal line 4, and thus transfers the image data G to the processor 3. The processor 3 may perform the requirement (control signal) described above for the transfer controller 5 through the signal line 4 or may perform it through a control signal line which is provided separately.

As described above, the transfer of the image data G to the processor 3 is performed by the transfer controller 5, and thus the processor 3 can allocate an operating time to the image processing without performing the transfer processing on the image data G. Hence, the processor 3 can allocate a larger proportion of the processing capability to the image processing, and thus even when the processor 3 has relatively low processing capability, the processor 3 can appropriately perform driving assistance through the individual cameras 8 in real time.

In short, in the image processing device 1 configured as described above, since the transfer controller 5 performs the transfer processing on the image data G, the processor 3 for the image processing does not perform any processing on the image data G until the image data G is transferred with the transfer controller 5 from the buffer 2 in which the image data G shot with each of the cameras 8 is stored, and performs the image processing on only the image data G acquired by the transfer. Moreover, for example, the processor 3 determines, from the image data G of the individual cameras 8 accumulated in the buffers 2, based on the state information S of the vehicle 9, the buffers 2 which need to be set to the target for the image processing so as to narrow the cameras 8 set to the target for the image processing to at least part of the cameras 8, and thus the number of pieces of image data which needs to be processed per unit time is reduced.

As described above, the processor 3 sets the image data G of the cameras 8 determined based on the state information S of the vehicle 9 to the target for the image processing, and does not perform processing until the image data G set to the target is acquired, with the result that it is possible to more rapidly perform environment recognition (the detection of a person and an article) around the vehicle 9 through the cameras 8. Hence, it is possible to avoid the provision of the processor 3 for each of the cameras 8 and the use of an expensive processor 3 having more excellent processing capability, and thus it is possible to reduce the cost of the vehicle 9.

In some embodiments, as shown in FIG. 1, the image processing device 1 may further include: a capture unit 11 (board) in which a plurality of buffers 2 described above and the transfer controller 5 are provided; an image processing buffer 6 (work buffer) which holds the image data G which is output by the transfer controller 5 to the signal line 4 and on which the processor 3 performs the image processing; a processor unit 12 (board) in which the processor 3 and the image processing buffer 6 are provided. In this case, the signal line 4 described above can connect the buffers 2 in the capture unit 11 and the image processing buffer 6 in the processor unit 12 to each other. The capture unit 11 described above may be formed with a programable logic device such as an FPGA.

In other words, the image data G which is transferred with the transfer controller 5 according to the requirement of the processor 3 is stored in the image processing buffer 6 provided in the processor unit 12. Then, the processor 3 performs the image processing on the image data G stored in the image processing buffer 6. The image processing buffer 6 of the embodiment shown in FIG. 1 is a queue (FIFO), and the processor 3 performs the image processing on one or more pieces of image data G stored in the image processing buffer 6 in an order in which the pieces of image data G are stored in the image processing buffer 6.

In the embodiment shown in FIG. 1, the image processing device 1 acquires the state information S of the vehicle 9 described above from a vehicle state monitoring portion 14 such as an ECU which is installed in the vehicle 9. More specifically, the vehicle state monitoring portion 14 collects, through a vehicle network 15 (such as a CAN) installed in the vehicle 9, the state information S of the vehicle 9 including the vehicle speed V and the shift position Sp, and stores the state information S in a buffer (state information buffer 62) for storing the state information S provided in the processor unit 12. The collection of the state information S with the vehicle state monitoring portion 14 and the storage of the state information S in the state information buffer 62 are cyclically performed, and thus the latest state information S is stored in the state information buffer 62. Hence, the processor 3 accesses the state information buffer 62 described above so as to be able to acquire the latest state information S of the vehicle 9, and determines, the buffers 2 which are set to the selection target based on the acquired state information S.

Although in the embodiment shown in FIG. 1, the vehicle state monitoring portion 14 is provided in the other unit on the side of the vehicle (control unit 13), the control unit 13 and the processor unit 12 may be connected with the vehicle network 15 or may be connected with separate wires.

In the configuration described above, the image data G of the individual cameras 8 managed with the buffers 2 is passed through the signal line 4 for connecting the capture unit 11 and the processor unit 12, is transferred to the image processing buffer 6 provided in the processor unit 12 and is subjected to the image processing in the processor 3. The management and the transfer processing of the buffers 2 in the capture unit 11 and the image processing in the processor unit 12 are separated in terms of hardware in this way, and thus as described above, it is possible to perform the environment recognition (detection of movement of a person and an article) around the vehicle 9 through the cameras 8 in a satisfactory real-time manner.

Figure 4:
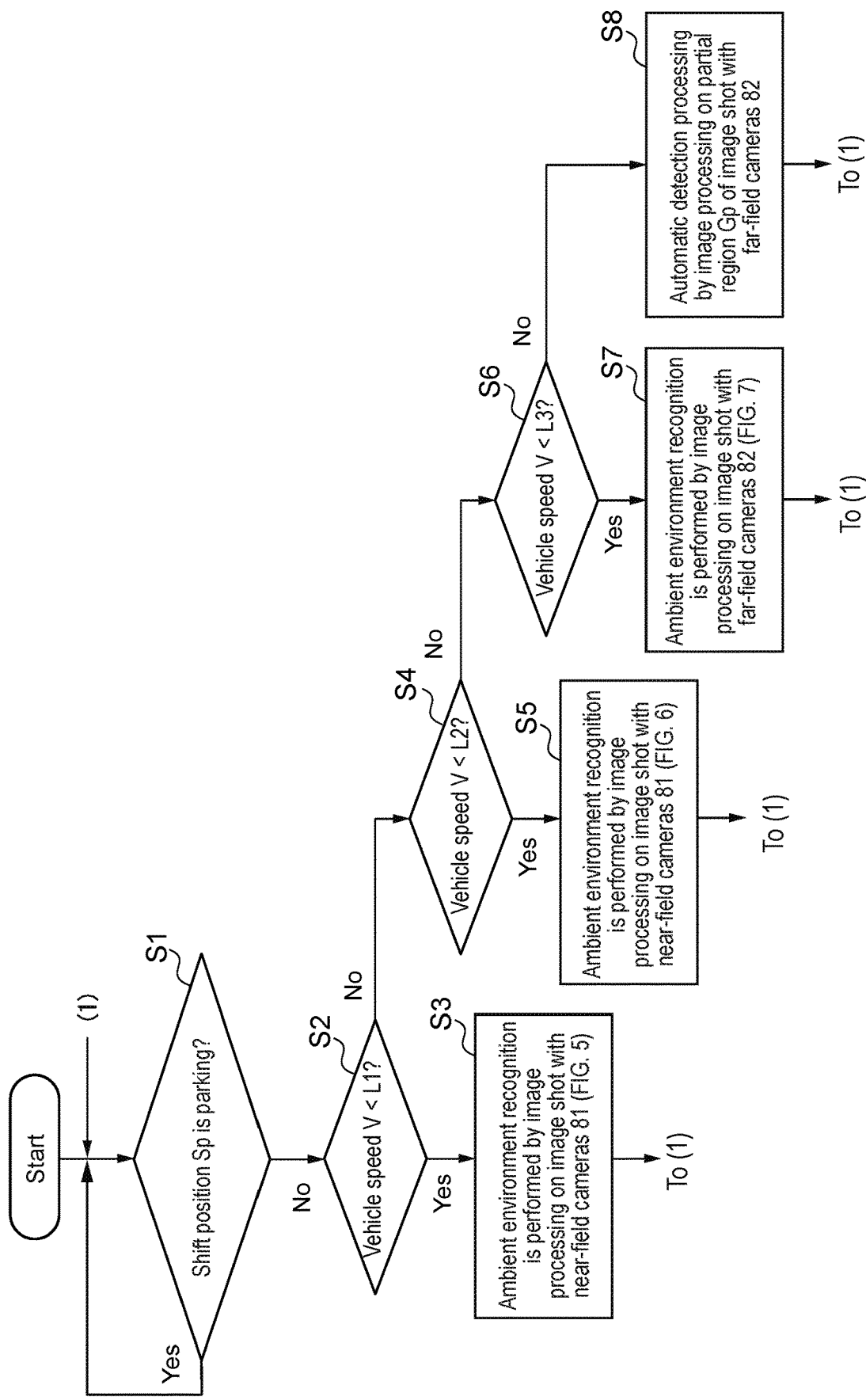
FIG. 4 is a flowchart showing a method of determining the buffers of a selection target in the embodiment of the present invention, and the cameras are selected according to a vehicle speed.
Figure 5:
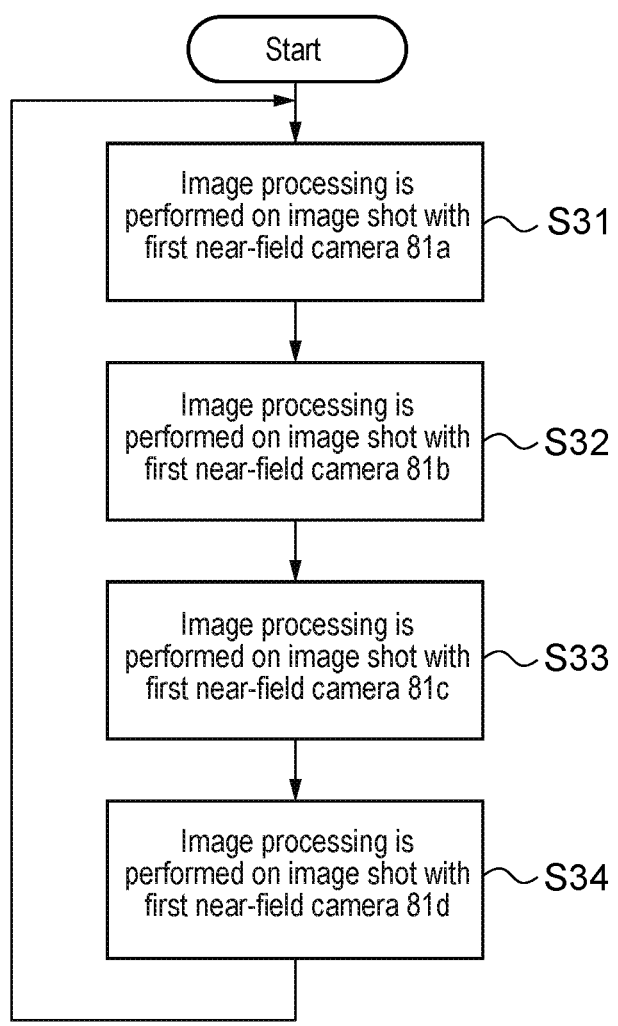
FIG. 5 is a diagram showing an order in which the buffers (cameras) are selected when the vehicle speed in the embodiment of the present invention is less than a first threshold value (V<L1)
Figure 6:
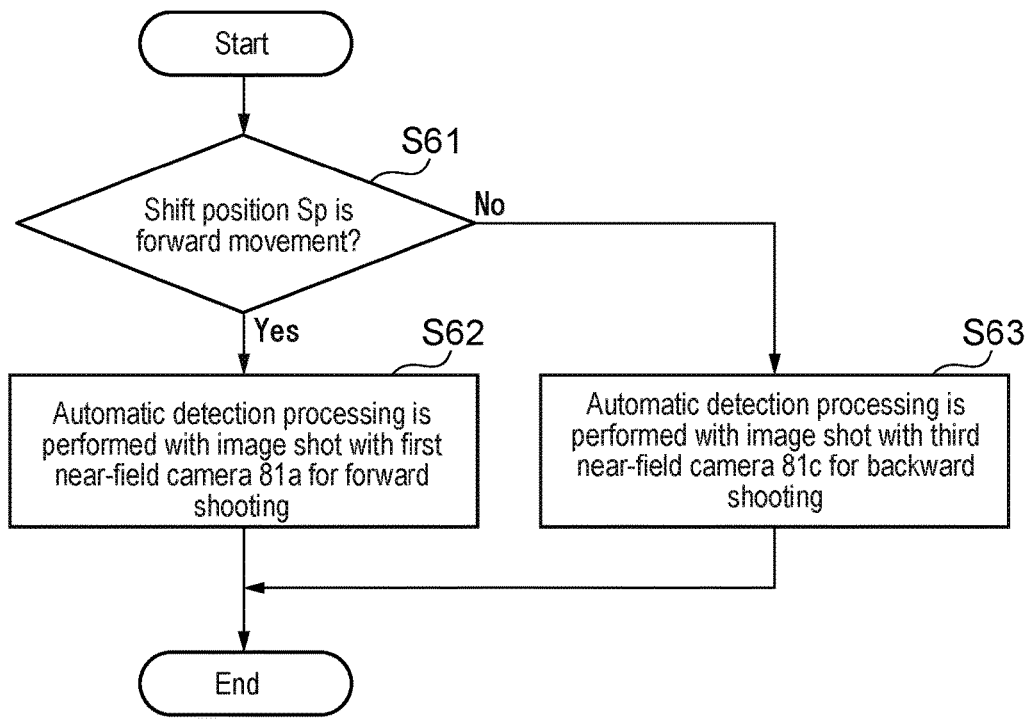
FIG. 6 is a diagram showing an order in which the buffers (cameras) are selected when the vehicle speed in the embodiment of the present invention is equal to or more than the first threshold value and less than a second threshold value (L1≤V<L2)
Figure 7:
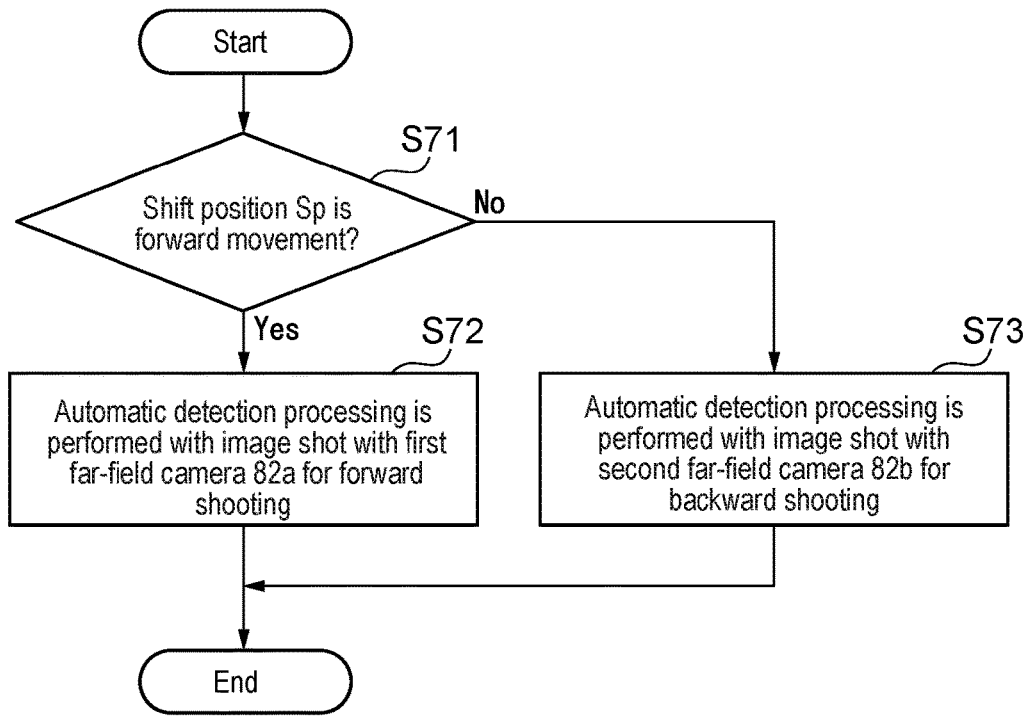
FIG. 7 is a diagram showing an order in which the buffers (cameras) are selected when the vehicle speed in the embodiment of the present invention is equal to or more than the second threshold value (L2≤V)
Figure 8:
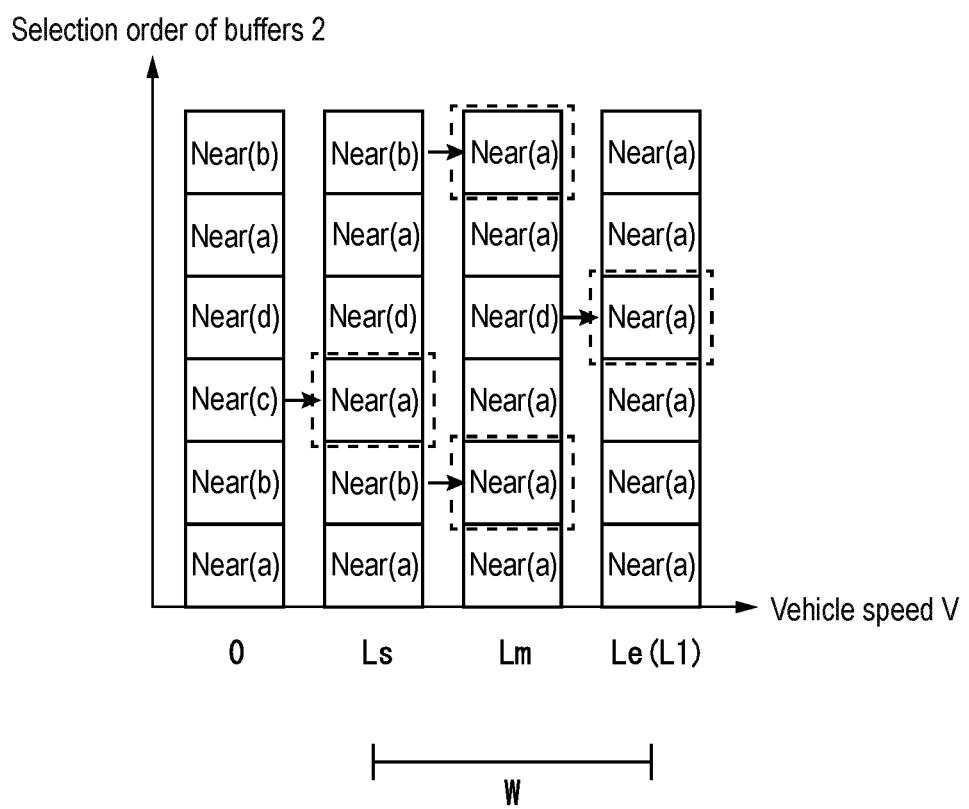
FIG. 8 is a diagram for illustrating the stepwise switching of the buffers around the first threshold value when the vehicle speed in the embodiment of the present invention is increased.
Figure 9:
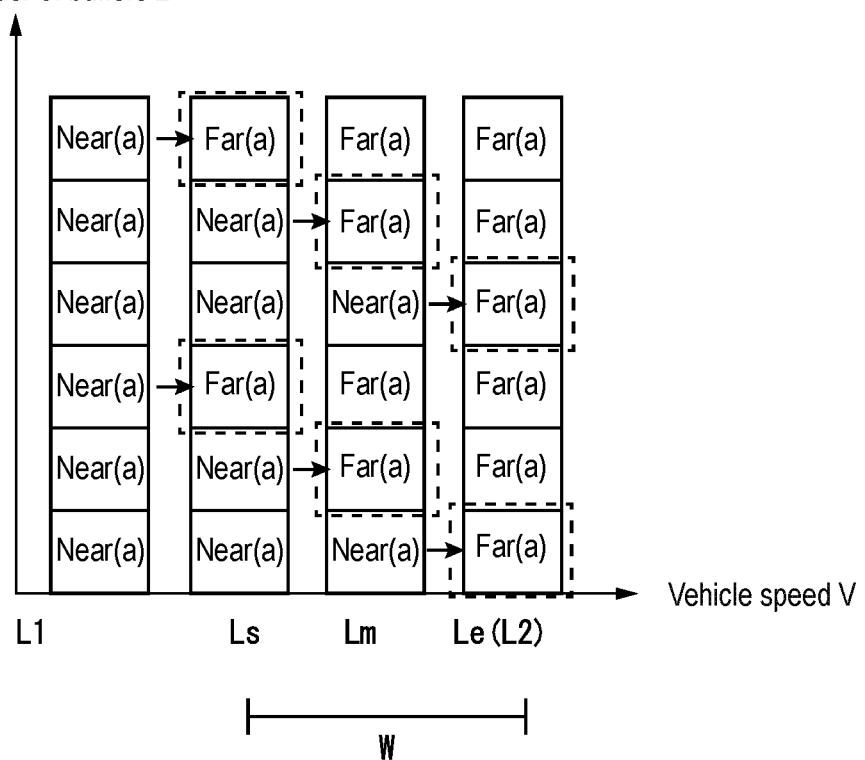
FIG. 9 is a diagram for illustrating the stepwise switching of the buffers around the second threshold value when the vehicle speed in the embodiment of the present invention is increased.
Figure 10:
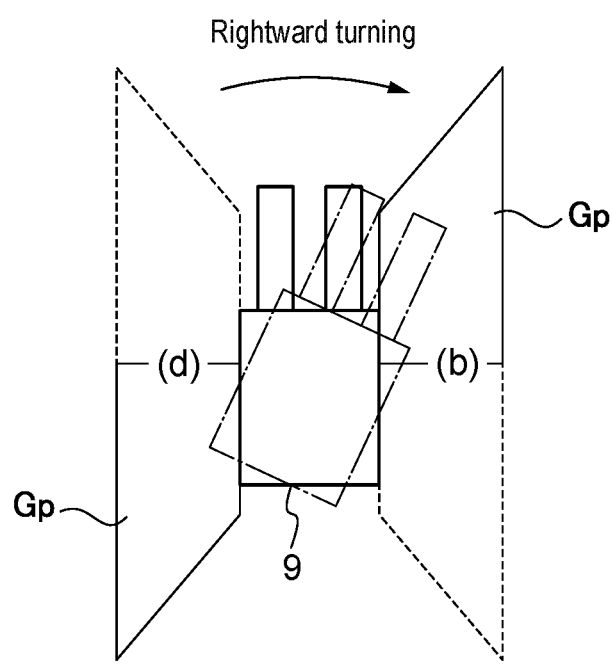
FIG. 10 is a diagram showing directions and regions which are monitored when a forklift vehicle in the embodiment of the present invention is turned.
Figure 11:
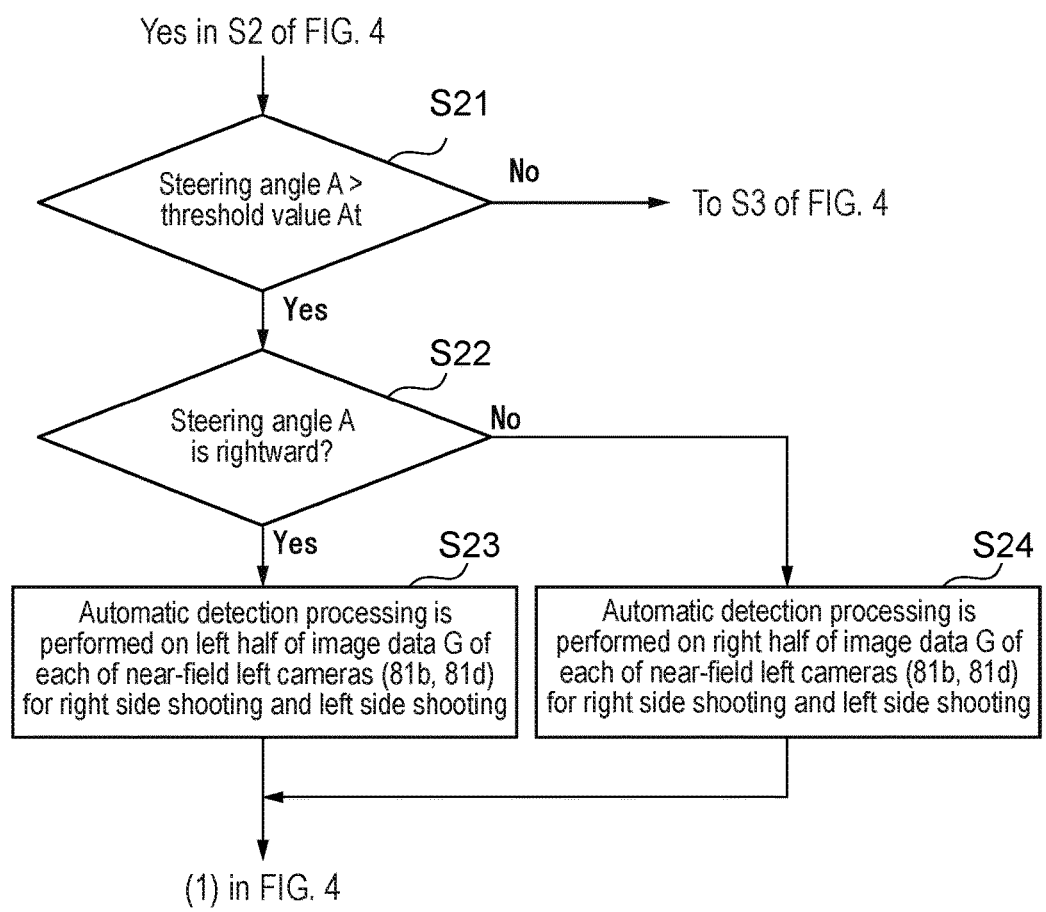
FIG. 11 is a flowchart showing a method of determining the buffers when the forklift vehicle in the embodiment of the present invention is turned.

Some embodiments on a method of determining the buffers 2 of the selection target described above will then be described with reference to FIGS. 4 to 10. FIG. 4 is a flowchart showing the method of determining the buffers 2 of the selection target in the embodiment of the present invention, and the cameras 8 are selected according to the vehicle speed V. FIG. 5 is a diagram showing an order in which the buffers 2 (cameras 8) are selected when the vehicle speed V in the embodiment of the present invention is less than a first threshold value L1 (V<L1). FIG. 6 is a diagram showing an order in which the buffers 2 (cameras 8) are selected when the vehicle speed V in the embodiment of the present invention is equal to or more than the first threshold value L1 and less than a second threshold value L2 (L1≤V<L2). FIG. 7 is a diagram showing an order in which the buffers 2 (cameras 8) are selected when the vehicle speed V in the embodiment of the present invention is equal to or more than the second threshold value L2 (L2≤V). FIG. 8 is a diagram for illustrating the stepwise switching of the buffers around the first threshold value L1 when the vehicle speed V in the embodiment of the present invention is increased. FIG. 9 is a diagram for illustrating the stepwise switching of the buffers around the second threshold value L2 when the vehicle speed V in the embodiment of the present invention is increased. FIG. 10 is a diagram showing directions and regions which are monitored when a forklift vehicle in the embodiment of the present invention is turned. FIG. 11 is a flowchart showing a method of determining the buffers 2 when the forklift vehicle in the embodiment of the present invention is turned.

In the following description, it is assumed that the processor 3 is operated according to the command of the image processing program described above so as to achieve realization. It is also assumed that in the first threshold value L1, the second threshold value L2 and a third threshold value L3, a relationship of L1<L2<L3 holds true.

In some embodiments, the state information S of the vehicle 9 includes the vehicle speed V. As shown in FIG. 4, the processor 3 may perform the selection of the buffers 2 described above based on the comparison of the vehicle speed V and predetermined threshold values L. In the embodiment shown in FIGS. 1 to 4, the processor 3 determines one or more of the buffers 2 which are set to the selection target described above according to the command of the image processing program for the selection target buffer determination portion 71 based on the comparison of the vehicle speed V and a plurality of threshold values L (L1 to L3). Specifically, in step S1 of FIG. 4, the processor 3 (selection target buffer determination portion 71) checks whether or not a driver intends to move the vehicle 9 by whether the shift position Sp is not parking. According to the commands of the selection target buffer determination portion 71 and the image data acquisition portion 72, when the shift position Sp is not parking (P), in step S2 and the subsequent steps, the selection of the cameras 8 (buffers 2) corresponding to the vehicle speed V is performed.

In general, there is an upper limit on the number of pieces of image data on which a processor can perform image processing per unit time. Hence, when the pieces of image data G of the cameras 8 are sequentially processed, as the number of cameras 8 (buffers 2) is increased, the number of pieces of image data on which the image processing is performed per unit time in each of the cameras 8 is decreased. As this number is decreased, a longer delay occurs in the image processing on the pieces of image data G which are sequentially fed from each of the cameras 8, and thus a time lag in the environment recognition through the image processing of the cameras is increased. However, as the vehicle speed V is increased, the time lag in the environment recognition through the image processing is more likely to be fatal whereas as the vehicle speed V is decreased, the time lag is more likely to serve as an allowable range. In other words, as the vehicle speed V is decreased, even when a larger number of cameras 8 are set to the target for the image processing, it is possible to appropriately perform driving assistance for the vehicle 9. Hence, in the present embodiment, the buffers 2 are switched according to the vehicle speed V, and thus the image processing is performed on images shot with cameras 8 which have a higher priority according to the driving assistance among the cameras 8 installed in the vehicle 9.

Specifically, for example, when the vehicle 9 is stopped before being moved or in a state (state where travelling is started) where the vehicle 9 is moved at a very low speed due to a creep phenomenon or the like, the vehicle 9 can be moved to various positions depending on a steering angle. Hence, it is considered that with the near-field cameras 81 which have a relatively wide angle of view so as to be able to appropriately shoot a near field or the like, it is necessary to monitor the entire surrounding of the present vehicle.

Hence, in some embodiments, as shown in FIG. 2, the cameras 8 include one or more of the cameras 8 (in FIG. 2, the four near-field cameras 81) for shooting the surrounding of the vehicle 9. The threshold values L described above which are compared with the vehicle speed V include the first threshold value L1. In this case, as shown in FIG. 4, when the vehicle speed V is less than the first threshold value L1 (V<L1), the processor 3 may select the buffers 2 in which the image data G shot with the one or more of the cameras 8 for shooting the entire surrounding of the vehicle is accumulated.

In the embodiment shown in FIG. 4, when V<L1 in step S2, in step S3, as shown in FIG. 5, ambient environment recognition is performed by the image processing on the image data G of the near-field cameras 81. In other words, the processor 3 sets, to the selection target, the four buffers 2 (2a to 2d) in which the image data G individually input from the four near-field cameras 81 is accumulated. Here, although the order in which the buffers 2 of the selection target are selected is arbitrary, for example, the selection may be performed as shown in FIG. 5. In the embodiment shown in FIG. 5, since on the image data G obtained by shooting with the near-field cameras 81, the processor 3 performs the image processing in the order of a first near-field camera 81a (the front of the vehicle 9), a second near-field camera 81b (the right side of the vehicle 9), a third near-field camera 81c (the back of the vehicle 9) and a fourth near-field camera 81d (the left side of the vehicle 9) (see steps S31 to S34 in FIG. 5), the pieces of image data G are sequentially acquired while the buffers 2 are being selected in the order of a first buffer 2a, a second buffer 2b, a third buffer 2c, a fourth buffer 2d, the first buffer 2a, . . . .

As in the embodiment shown in FIG. 1, in order to obtain the entire surrounding, the number of cameras set to the target for the image processing is more likely to be increased. Hence, when the images of the cameras 8 are sequentially switched one by one, and then the image processing is performed, as the number of cameras 8 is increased, the processing cycle of the image data G in the individual cameras 8 (individual buffers 2) is prolonged. However, since the vehicle 9 is moved at a very low speed, as long as the image processing is allowed (is not problematic) as the driving assistance for the vehicle 9, the image processing can be performed on the images shot with the individual cameras 8.

It is considered that even when the vehicle speed V is equal to or more than the first threshold value L1, for example, in a state (low-speed travelling state) where the vehicle 9 can be rapidly moved in a lateral direction with respect to the direction of travelling depending on the steering angle, it is necessary to use the near-field cameras 81 and the like so as to monitor a wide area in the direction of travelling of the present vehicle.

Hence, in some other embodiments, as shown in FIG. 2, the cameras 8 include at least the cameras 8 (in FIG. 2, the two near-field cameras 81 installed in the front and back of the vehicle 9) for individually shooting an area ahead of the vehicle 9 and an area behind the vehicle 9. The state information S of the vehicle 9 further includes the shift position Sp of the gear of the vehicle 9. The threshold values L described above which are compared with the vehicle speed V include the first threshold value L1 and the second threshold value L2 which is more than the first threshold value L1. In this case, when as shown in FIGS. 4 and 6, the vehicle speed V is equal to or more than the first threshold value L1 and less than the second threshold value L2 ($L1 \leq V < L2$), and the shift position Sp indicates a forward movement, the processor 3 may select the buffer 2 in which the image data G shot with the camera 8 (in FIG. 2, the first near-field camera 81a) for shooting the area ahead of the vehicle 9 is accumulated whereas when the shift position Sp indicates a backward movement, the processor 3 may select the buffer 2 in which the image data G shot with the camera 8 (in FIG. 2, the third near-field camera 81c) for shooting the area behind the vehicle 9 is accumulated.

In the embodiment shown in FIG. 4, when in step S2 described above, a relationship of V<L1 does not hold true, and in the subsequent step S4, L1≤V<L2, in step S5, the ambient environment recognition which is different from that in step S3 described above is performed by the image processing on the image data G of the near-field cameras 81. Specifically, as shown in FIG. 6, in step S61, the processor 3 (selection target buffer determination portion 71) checks the shift position Sp. Then, when the shift position Sp indicates the forward movement, in step S62, the first buffer 2a in which the image data G of the first near-field camera 81a for shooting a near-field area ahead of the vehicle 9 is accumulated is set to the selection target. By contrast, when the shift position Sp indicates the backward movement, in step S63, the third buffer 2c in which the image data G of the third near-field camera 81c for shooting a near-field area behind the vehicle 9 is accumulated is set to the selection target.

By contrast, in a travelling state where the vehicle speed is relatively so high that the vehicle cannot be rapidly turned in direction by steering, the time allowed for feedback (for example, automatic braking in the vehicle 9 or a warning for the driver) from the environment recognition (the detection of a person and an article) through the image processing to the driver of the vehicle 9 or the like is more shortened. Hence, it is considered that a distant area from the vehicle 9 is monitored, and that thus it is necessary to detect a target (a person and an article) in a distant area in an earlier stage.

Hence, in some embodiments, as shown in FIG. 2, the cameras 8 include: the far-field cameras 82 for shooting a far-field area in the direction of travelling of the vehicle 9; and the near-field cameras 81 which shoot the near-field area in the direction of travelling of the vehicle 9 and which have a wider angle of view than the far-field cameras 82. The threshold values L described above which are compared with the vehicle speed V include the second threshold value L2. As shown in FIGS. 4 and 7, when the vehicle speed V is equal to or more than the second threshold value L2, the processor 3 may select the buffers 2 (2e and 2f in FIG. 1) in which the image data G shot with the far-field cameras 82 is accumulated whereas when the vehicle speed V is less than the second threshold value L2, the processor 3 may select the buffers 2 (2a to 2d in FIG. 1) in which the image data G shot with the near-field cameras 81 is accumulated.

In the embodiment shown in FIG. 4, when in step S4 described above, a relationship of V<L2 does not hold true, and in the subsequent step S6, L2≤V<L3 (or L2≤V), in step S7, the ambient environment recognition is performed by the image processing on the image data G of the far-field cameras 82. Specifically, as shown in FIG. 7, in step S71, the processor 3 (selection target buffer determination portion 71) checks the shift position Sp. Then, when the shift position Sp indicates the forward movement, in step S72, the processor 3 (the same as described above) sets, to the selection target, the fifth buffer 2e in which the image data G of the first far-field camera 82a for shooting the far-field area ahead of the vehicle 9 is accumulated. By contrast, when the shift position Sp indicates the backward movement, in step S73, the processor 3 sets, to the selection target, the sixth buffer 2f in which the image data G of the second far-field camera 82b for shooting a far-field area behind the vehicle 9 is accumulated.

In the configuration described above, based on the comparison of the vehicle speed V and the threshold values L, the processor 3 makes a selection such as by determining the buffers 2 which are set to the target for the image processing. As described above, the cameras 8 (buffers 2) which are set to the target for the image processing are selected by the relationship with the vehicle speed V, and thus even the processor 3 whose processing capability is relatively low can appropriately perform the driving assistance for the vehicle through the environment recognition using the cameras 8 in a satisfactory real-time manner.

In some embodiments, as shown in FIGS. 8 and 9, the threshold values L described above which are compared with the vehicle speed V may include a switching start threshold value Ls and a switching completion threshold value Le in which a difference with the switching start threshold value Ls is a first value W. In this case, when the vehicle speed V is between the switching start threshold value Ls and the switching completion threshold value Le, the processor 3 may switch the buffers 2 to be selected such that, as the vehicle speed V approaches the switching completion threshold value Le from the switching start threshold value Ls, a predetermined number of pieces of image data G on which the image processing is performed per unit time before the vehicle speed V reaches the switching start threshold value Ls is replaced with the predetermined number of pieces of image data G after the vehicle speed V reaches the switching completion threshold value Le. In other words, a ratio of the camera 8 (in FIG. 8 the first near-field camera 81a) whose priority (importance) is high is gradually increased according to the vehicle speed V.

When the cameras 8 (buffers 2) which are set to the target for the image processing of the processor 3 are exactly switched at a predetermined threshold value L (the first threshold value L1 or the second threshold value L2), for example, if the vehicle speed V obtained from the vehicle 9 includes an error, appropriate buffers 2 corresponding to the vehicle speed V are not selected around the threshold value L, with the result that it is likely that the appropriate environment recognition is not performed. Hence, in the present embodiment, the buffers 2 which are set to the selection target are gradually switched.

Here, since the processor 3 performs the image processing on the predetermined number of pieces of image data G per unit time, the predetermined number of pieces of image data G are formed with image data G acquired from one or more of buffers 2 of the selection target. The switching start threshold value Ls is the threshold value L which provides an opportunity to switch part of the buffers 2 acquiring the predetermined pieces of image data G to any one of the one or more of buffers 2 selected by the processor 3 when the vehicle speed V reaches the switching completion threshold value Le. The switching completion threshold value Le is, for example, the first threshold value L1 or the second threshold value L2 described above, and the switching start threshold value Ls is a value obtained by increasing or decreasing the switching completion threshold value Le only by the first value W. Specifically, for example, when the switching completion threshold value Le is the first threshold value L1 described above, the switching start threshold value Ls is Le+W (where Le+W<L2) or Le−W. For example, when the switching completion threshold value Le is the second threshold value L2 described above, the switching start threshold value Ls is Le+W or Le−W (where Le−W>L1). Between the switching start threshold value Ls and the switching completion threshold value Le, as shown in FIGS. 8 and 9, one or more threshold values (stepwise threshold value Lm) may further be provided so that the switching described above is performed more stepwise.

In the embodiment shown in FIG. 8, the switching completion threshold value Le is the first threshold value L1 described above, and the switching start threshold value Ls is a value obtained by decreasing the first threshold value L1 only by the first value W (Ls=Le−W). In this case, in the embodiment shown in FIGS. 1 to 3, when the vehicle speed V is less than the first threshold value L1 (Le), the processor 3 sequentially selects the four buffers 2 (2a to 2d) corresponding to the four near-field cameras 81 (see FIG. 5) whereas when the vehicle speed V is equal to or more than the first threshold value L1, the processor 3 selects only the first buffer 2a corresponding to the first near-field camera 81a which shoots the area ahead of the vehicle 9 (see FIG. 6).

Hence, in a case where the shift position Sp indicates the forward movement and the vehicle speed V is sequentially increased from zero, when the vehicle speed V is less than the switching start threshold value Ls (V<Ls), the processor 3 (image data acquisition portion 72) sequentially selects the first buffer 2a, the second buffer 2b, the third buffer 2c and the fourth buffer 2d, thereafter returns to the first buffer 2a again and repeatedly makes the selection in the same order. Thereafter, when the vehicle speed V reaches the switching start threshold value Ls, the processor 3 (the same as described above) replaces at least one of the second buffer 2b, the third buffer 2c and the fourth buffer 2d among the buffers 2 (2a to 2d) which have so far been included in the selection target with the first buffer 2a.

Here, as shown in FIG. 8, when the vehicle speed V reaches the switching start threshold value Ls, the processor 3 may switch the camera 8 (in FIG. 8, the first near-field camera 81a for shooting the area ahead) corresponding to the buffer 2 (in FIG. 8, only the first buffer 2a) which needs to be selected when the vehicle speed V reaches the switching completion threshold value Le and the buffer 2 (in FIG. 8, the third buffer 2c) corresponding to the camera 8 (in FIG. 8, the third near-field camera 81c for shooting the area behind) which is least associated with the direction of shooting.

In the embodiment shown in FIG. 8, the processor 3 switches the third buffer 2c corresponding to the third near-field camera 81c for shooting the area behind the vehicle 9 to the first buffer 2a. In other words, when the vehicle speed V reaches the switching completion threshold value Le (first threshold value L1), since a state where the image data G in the four directions of the front, the back, the left and the right of the vehicle 9 has so far been set to the target for the image processing is changed to a state where only the area ahead is monitored, and thus the backward direction is opposite to the forward direction, the image data G in the backward direction is said to be least important among the left, the right and the back of the vehicle 9. Hence, when the vehicle speed V reaches the switching start threshold value Ls, the processor 3 switches the third buffer 2c.

In the embodiment shown in FIG. 8, the stepwise threshold value Lm is provided between the switching start threshold value Ls and the switching completion threshold value Le, and when the vehicle speed V is increased from the switching start threshold value Ls so as to reach the stepwise threshold value Lm (V=Lm), the second buffer 2b corresponding to the second near-field camera 81b for shooting an area on the right of the vehicle 9 is switched to the first buffer 2a. Then, when the vehicle speed V is further increased so as to reach the switching completion threshold value Le (V=Le), the processor 3 switches the fourth buffer 2d corresponding to the fourth near-field camera 81d for shooting an area on the left of the vehicle 9 to the first buffer 2a. In this way, at the first threshold value L1, the processor 3 sets the first buffer 2a corresponding to the first near-field camera 81a to the selection target so as to perform the image processing. Thus, the ratio of the camera 8 (in FIG. 8 the first near-field camera 81a) whose importance is high is gradually increased according to the vehicle speed V.

On the other hand, in the embodiment shown in FIG. 9, the switching completion threshold value Le is the second threshold value L2 described above, and the switching start threshold value Ls is a value obtained by decreasing the second threshold value L2 only by the first value W (Ls=Le−W). In this case, in the embodiment shown in FIGS. 1 to 3, as described above, when the vehicle speed V is equal to or more than the first threshold value L1 and less than the second threshold value L2, the processor 3 selects only the first buffer 2a corresponding to the first near-field camera 81a for shooting the area ahead of the vehicle 9 (see FIG. 6) whereas when the vehicle speed V is equal to or more than the second threshold value L2, the processor 3 selects only the fifth buffer 2e corresponding to the first far-field camera 82a for shooting the area ahead of the vehicle 9 (see FIG. 7).

Hence, in a case where the shift position Sp indicates the forward movement and the vehicle speed V is sequentially increased from the first threshold value L1, when the vehicle speed V is less than the switching start threshold value Ls (V<Ls), the processor 3 selects only the first buffer 2a. Thereafter, when the vehicle speed V reaches the switching start threshold value Ls, the processor 3 includes (adds) the fifth buffer 2e in the current selection target, and decrease the selection frequency of the first buffer 2a which is the current section target. In the embodiment shown in FIG. 9, among three continuous pieces of image data G on which the image processing is performed, the first buffer 2a of the last piece of image data G is replaced with the fifth buffer 2e, and thus the selection frequency of the first buffer 2a is lowered. Furthermore, when the vehicle speed V is increased so as to reach the stepwise threshold value Lm, the last two pieces among the three continuous pieces of image data G are replaced with the fifth buffer 2e. Furthermore, when the vehicle speed V is increased so as to reach the switching completion threshold value Le, only the fifth buffer 2e is selected. In this way, a ratio of the camera 8 (in FIG. 9 the first far-field camera 82a) whose importance is high is gradually increased according to the vehicle speed V.

Although in the above discussion, the case where the vehicle speed V is increased is described, the same is true for a case where when the vehicle speed V is decreased, the vehicle speed V is passed through the switching start threshold value Ls, the stepwise threshold value Lm and the switching completion threshold value Le in this order.

In the configuration described above, the cameras 8 (buffers 2) which are set to the target for the image processing of the processor 3 are gradually switched from the preceding stage so as to be completely switched at the predetermined threshold values L (such as the first threshold value L1 and the second threshold value L2 described above). In this way, even when the vehicle speed V obtained from the vehicle 9 has an error, the ambient environment recognition on the vehicle 9 can be appropriately performed.

In some embodiments, the image processing device 1 may further include a characteristic information acquisition portion 74 (acquisition portion) which acquires characteristic information including an instruction for the monitoring direction in a specific place, and the processor 3 selects the buffer 2 based on the characteristic information. In the vehicle 9 which travels in various places, a place (specific place) is present in which it is preferable to monitor the specific direction in a focused manner as the driving assistance, and for example, a place is present in which accidents where a person jumps out from the rightward direction often occur. Hence, the image processing device 1 acquires the characteristic information described above so as to include, in the selection target, the buffer 2 corresponding to the camera 8 for shooting an area in the monitoring direction indicated by the characteristic information. Here, the selection frequency of the buffer 2 corresponding to the camera 8 for shooting the area in the monitoring direction indicated by the characteristic information may also be increased beyond those of the other buffers 2 included in the selection target.

More specifically, the image processing device 1 (image processing program) may further include, as shown in FIG. 3, in addition to the characteristic information acquisition portion 74 described above, a position acquisition portion 75 which acquires the position of travelling of the vehicle 9. In the embodiment shown in FIG. 3, the characteristic information described above is made to correspond to the specific place, and when the position of travelling of the vehicle 9 reaches the specific place corresponding to the characteristic information, the buffer 2 corresponding to the camera 8 for shooting the area in the monitoring direction indicated by the characteristic information is included in the selection target. The characteristic information acquisition portion 74 and the position acquisition portion 75 may be realized by the operation of the processor 3 according to the command of the image processing program or may be realized by use of hardware. In the embodiment shown in FIG. 3, the instruction for the monitoring direction is input to the selection target buffer determination portion 71, and thus the buffer 2 corresponding to the camera 8 for shooting the area in the monitoring direction is included in the selection target.

The position of travelling of the vehicle 9 may be acquired by a self-position recognition technology such as GPS (Global Positioning System) or SLAM (Simultaneous Localization and Mapping) or the position of travelling (position information) may be acquired from the outside by communication with a beacon station installed in a road, communication with a base station in a mobile communication network or communication with the outside by use of a wireless communication technology such as a near-field communication using RFID (Radio Frequency ID entification). The specific place and the characteristic information are previously databased, and the information thereof may be acquired by performing communication with the outside as necessary or the image processing device 1 may hold this database. Alternatively, in the image processing device 1, a device such as a beacon station may be installed near the specific place, and the buffer 2 corresponding to the camera 8 which shoots, when communication from the device such as a beacon station is received, based on the information of the monitoring direction included in the characteristic information obtained by this communication, an area in the direction thereof may be included in the selection target.

In the configuration described above, the processor 3 sets the image data G of the camera 8 for shooting the area in the monitoring direction indicated by the characteristic information to the target for the image processing. Although in the vehicle 9 which travels in various places, it may be necessary to monitor the specific direction in a focused manner such as a place in which accidents often occur, the cameras 8 which are set to the target for the image processing are switched based on the characteristic information, and thus it is possible to perform the driving assistance which is safer.

In some embodiments, for example, when the vehicle 9 is an industrial vehicle, the state information S of the vehicle 9 includes the vehicle speed V and a steering angle A, and the processor 3 may determine whether the turning of the vehicle 9 is rightward turning or leftward turning based on the state information S. Then, when the vehicle 9 is turned rightward, the processor 3 may select the buffer 2 in which the image data G obtained by shooting at least an area on the right side in the forward direction and an area on the left side in the backward direction with respect to the direction of travelling is accumulated whereas when the vehicle 9 is turned leftward, the processor 3 may select the buffer 2 in which the image data G obtained by shooting at least an area on the left side in the forward direction and an area on the right side in the backward direction with respect to the direction of travelling is accumulated.

As shown in FIG. 10, for example, since an industrial vehicle such as a forklift has a short wheel base and a large steering angle, it is necessary to pay sufficient attention to the lateral direction as compared with the forward direction with respect to the direction of travelling when travelling is started in a state where a steering wheel is turned. Specifically, it is necessary to simultaneously monitor not only the right side in the forward direction with respect to the direction of travelling but also the left side in the backward direction with respect thereto at the time of rightward turning and not only the left side in the forward direction with respect to the direction of travelling but also the right side in the backward direction with respect thereto at the time of leftward turning.

However, when as described above, the image data G obtained by shooting an area on the side of the direction opposite to the direction of travelling is also set to the target for the image processing, the number of cameras 8 on which the processor 3 performs the image processing is simply increased, and thus the selection frequencies of the buffers 2 included in the selection target are decreased (the cycle of the selection is prolonged).

Hence, in some embodiments, as shown in FIGS. 10 and 11, the cameras 8 include a right-side shooting camera (in FIG. 2, the second near-field camera 81b) for shooting the area on the right side of the vehicle 9 and a left-side shooting camera (in FIG. 2, the fourth near-field camera 81d) for shooting the area on the left side thereof. The processor 3 is operated according to the command of the image processing program for the image processing portion 73, and thus at the time of rightward turning, the image processing may be performed on the region (partial region Gp, in FIG. 10, the left half of the image data G) of part of the left side of the image data G individually shot with the right-side shooting camera and the left-side shooting camera described above whereas at the time of leftward turning, the image processing may be performed on the partial region Gp (in FIG. 10, the right half of the image data G) of the right side of the image data G individually shot with the right-side shooting camera and the left-side shooting camera described above. In this way, it is possible to perform the driving assistance which is safer in a satisfactory real-time manner.

FIG. 11 corresponds to transition from step S2 to step S3 in FIG. 4, and when in step S2 of FIG. 4, the vehicle speed V is less than the first threshold value L1 described above (V<L1), in step S21 of FIG. 11, the steering angle A is checked, and when the steering angle A is equal to or less than a steering angle threshold value At (A≤At), the process proceeds to step S3 of FIG. 4 as already described. By contrast, when in step S21 of FIG. 11, the steering angle A is more than the steering angle threshold value At (A>At), in step S22, the steering angle A is checked. Then, when the steering angle A indicates rightward turning, in step S23, the image processing is performed on the region of the left half of the image data G individually shot with the right-side shooting camera and the left-side shooting camera described above. By contrast, when the steering angle A indicates leftward turning, in step S24, the image processing is performed on the region of the right half of the image data G individually shot with the right-side shooting camera and the left-side shooting camera described above.

In the configuration described above, the processor 3 determines the direction of turning based on the vehicle speed V and the steering angle A, and selects, based on the result of the determination, the cameras 8 which are set to the target for the image processing. As described above, according to the direction of turning (steering angle) of the vehicle, the image data G of not only one side such as the right side but also the opposite side (left side) is set to the target for the image processing, and thus at the time of lateral turning, while attention is being paid to the direction opposite to the direction of travelling as well, for example, the detection of a person and an article is performed, with the result that it is possible to perform the driving assistance which is safer.

Figure 12:
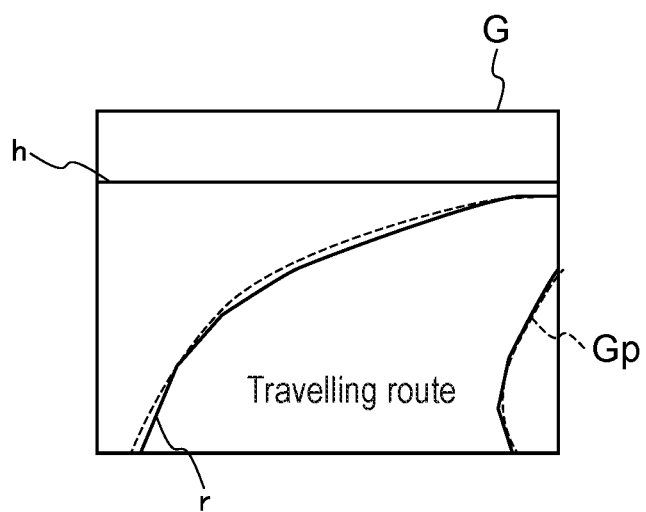
FIG. 12 is a diagram showing a travelling route in image data which is set to the target for image processing in the embodiment of the present invention.
Figure 13:
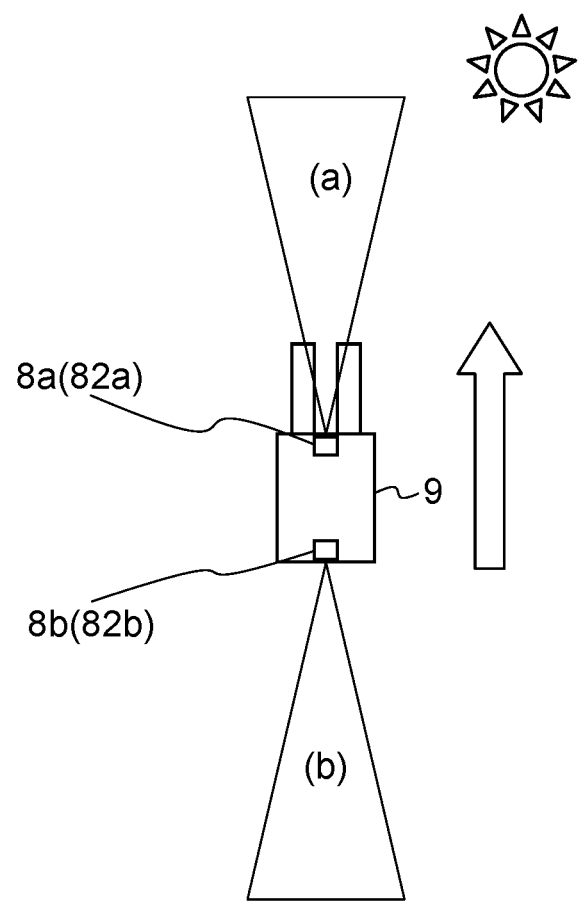
FIG. 13 is a diagram for illustrating a case where the vehicle image processing device according to the embodiment of the present invention determines the backlit state of the vehicle.

Another embodiment will then be described with reference to FIGS. 12 and 13. FIG. 12 is a diagram showing a travelling route in the image data G which is set to the target for the image processing in the embodiment of the present invention. FIG. 13 is a diagram for illustrating a case where the vehicle image processing device 1 according to the embodiment of the present invention determines the backlit state of the vehicle 9.

In some embodiments, the state information S of the vehicle 9 described above includes the steering angle A and the shift position Sp. As shown in FIG. 12, the processor 3 is operated according to the command of the image processing program for the image processing portion 73 so as to perform the image processing on the region (partial region Gp) of part included in the image data G acquired from the buffers 2 based on the steering angle A and the shift position Sp. Although in a camera image shown in FIG. 12, a horizon h is shown in a distant area, and a road r is curved in the rightward direction, when the vehicle 9 travels along the road r, it is considered that the necessity to perform automatic detection processing on the regions other than the travelling route is not high. As described above, the image processing is performed on only the partial region Gp of the image data G, and thus it is possible to decrease the amount of information of each piece of image data G on which the image processing is performed, with the result that it is possible to reduce the performance time of the image processing on one piece of image data G.

For example, in some embodiments, as shown in FIG. 12, based on the steering angle A and the shift position Sp, the route on which the vehicle 9 travels may be estimated, and based on the result of the estimation, the partial region Gp of the image data G may be determined. In the embodiment shown in FIG. 12, the processor 3 performs the image processing on the estimated travelling route, and performs, for example, the automatic detection processing on only the estimated travelling route. For example, when the threshold values L which are compared with the vehicle speed V described above include the third threshold value L3, and as shown in FIG. 4, the vehicle speed V is equal to or more than the third threshold value L3, the processor 3 may perform, based on the result of prediction of the travelling route based on the steering angle A and the shift position Sp, the image processing on the partial region Gp included in the image data G acquired from the buffers 2. Although the prediction of the travelling route may be performed by a known method, the prediction of the travelling route may be performed with consideration given to the size of the present vehicle, the position in which the camera 8 is attached, the angle (optical axis angle) at which the camera 8 is attached and the internal parameters of the camera 8. In this way, for example, when the vehicle speed V exceeds the second threshold value L2 and is further increased, the number of cameras 8 which are set to the target for the image processing is narrowed, and moreover, the region of each piece of image data G acquired on which the image processing is performed is decreased, with the result that the number of pieces of image data G on which the processor 3 can perform the image processing per unit time is increased and that thus it is possible to perform the environment recognition in real time.

In some other embodiments, for example, the regions of an upper portion and part of the left and right of the image data G which is determined according to the vehicle speed V and the steering angle A are removed from the target of the image processing, and thus based on the vehicle speed V, the steering angle A and the shift position Sp, the partial region Gp of the image data G on which the image processing needs to be performed may be determined. For example, in FIG. 12, it is found from the steering angle A that the vehicle 9 travels so as to turn to the right, and thus with consideration given to the vehicle speed V, regions of an upper portion and a left side of the shot image may be removed from the target for the image processing.

In the configuration described above, based on the steering angle A and the shift position Sp, part of each piece of image data G is extracted so as to be set to the target for the image processing. In this way, in each piece of image data G, the image processing on the partial region which does not include the travelling route of the vehicle predicted based on the steering angle A and the shift position Sp can be omitted. Hence, it is possible to reduce the burden of the image processing on each piece of image data G, and thus it is possible to increase the number of pieces of image data G on which the image processing can be performed per unit time. Consequently, it is possible to cope with a performance time which is required in a high vehicle speed V or the like.

In some embodiments, as shown in FIG. 13, the cameras 8 include a first camera 8a for shooting an area in one direction of the vehicle 9 and a second camera 8b for shooting an area in a direction different from the one direction. As shown in FIG. 3, the image processing device 1 may further include an adjustment portion 76 which adjusts, based on the brightness of the image data G individually shot with the first camera 8a and the second camera 8b described above, shooting parameters for each of the cameras 8. The processor 3 described above may be operated according to the command of the image processing program such that the adjustment portion 76 is realized or the adjustment portion 76 may be realized by use of another type of hardware. In the embodiment shown in FIG. 13, the first camera 8a is the first far-field camera 82a, and the second camera 8b is the second far-field camera 82b which shoots an area in a direction opposite to the one direction shot with the first camera 8a. However, the present invention is not limited to the present embodiment. In some other embodiments, the first camera 8a and the second camera 8b do not need to be the same type as long as the directions of shooting are different between the first camera 8a and the second camera 8b, and for example, the first camera 8a is the far-field camera 82 and the second camera 8b is the near-field camera.

As described previously, since the entire surrounding of the vehicle 9 is shot with the cameras 8, in an outdoor area, depending on a positional relationship with sunlight, some cameras 8 are backlit and some camera 8 are frontlit, and when the shooting parameters for all the cameras are the same, it is likely that there is a camera which cannot obtain images of appropriate image quality (for example, brightness). Hence, in the present embodiment, for example, each time cameras 8 other than the cameras 8 which are set to the target for the image processing are temporarily included in the selection target, the brightness of the image data G is evaluated such that an ambient environment on light and the like is estimated and thus the shooting parameters for the cameras 8 are automatically adjusted as necessary, with the result that in any environment, the image data G of appropriate image quality can be obtained from the individual cameras 8.

Specifically, in the embodiment described above, when the vehicle speed V is equal to or more than the first threshold value L1, the environment recognition is performed with only the camera 8 (the first near-field camera 81a or the first far-field camera 82a) for shooting the area in the direction of travelling, and for example, this camera 8 is the first camera 8a described above. Here, the processor 3 cyclically (for example, once per 10 seconds) acquires the image data G shot with the camera 8 (the third near-field camera 81c or the second far-field camera 82b) for shooting the area in the direction opposite to the direction of travelling or the like. For example, this camera 8 is the second camera 8b described above. Then, the brightness of the image data G of each of the first camera 8a and the second camera 8b is evaluated.

Thereafter, for example, the average brightness (first average brightness I1) of a plurality of pieces of image data G formed with only images shot with the first camera 8a and the average brightness (second average brightness I2) of a plurality of pieces of image data G formed with images shot with the first camera 8a and the second camera 8b may be individually evaluated. For example, among pieces of image data G continuously acquired with time, the second average brightness I2 of a plurality of continuous pieces of image data G which includes the image data G obtained by shooting the area in the direction opposite to the direction of travelling may be evaluated, and the first average brightness I1 of a plurality of continuous pieces of image data G which do not include the image data G in the opposite direction may be evaluated. Then, when I1<I2, it is determined that the camera 8 for shooting the area in the direction of travelling at that time is in the backlit state, and thus the setting of the shooting parameters for the first camera 8a is changed such that, for example, the image data G generated by the cameras 8 in the backlit state is made bright and that thus it is possible to perform appropriate shooting. By contrast, when I1>I2, the setting is changed such that the brightness of the first camera 8a is lowered.

In the embodiment shown in FIG. 13, the brightness of the image data G of the first camera 8a is relatively low due to backlight, and the brightness of the image data G of the second camera 8b is relatively high due to frontlight. Hence, a relationship of I1<I2 holds true, and thus the adjustment portion 76 determines that the first camera 8a for the direction of travelling is backlit so as to change the setting of the shooting parameters and to thereby make the image data G of the first camera 8a bright.

In the configuration described above, the frontlight and backlight of the cameras 8 which are set to the target for the image processing are detected such that the shooting parameters for the cameras 8 are adjusted, and thus it is possible to minimize influence caused by variations in brightness produced by sunlight, with the result that it is possible to perform stable environment recognition.

The present invention is not limited to the embodiments described above, and includes embodiments obtained by adding variations to the embodiments described above and embodiments obtained by combining these embodiments.

The characteristic information acquisition portion 74 described above is an example of the acquisition portion.

The programs described above are software for instructing a computer to realize individual function portions which will be described later, and may be stored in a computer readable storage medium.

The invention claimed is:

1. A vehicle image processing device comprising:
a plurality of buffers configured to accumulate pieces of image data input individually and sequentially from a plurality of cameras installed in a vehicle and respectively shooting different surrounding regions of the vehicle so as to associate the pieces of image data with the cameras;
a processor configured to select the buffer based on state information for determining traveling conditions of the vehicle and acquire the piece of image data from the selected buffer so as to perform image processing thereon;
a signal line transferring the pieces of image data in the buffers to the processor; and
a transfer controller configured to output the piece of image data in the buffer required from the processor to the signal line through selecting based on the state information,
wherein the processor is configured to determine, based on the state information, at least one buffer among the plurality of buffers as a selection target, and set a selection frequency of the at least one buffer included in the selection target higher than selection frequencies of the other buffers so as to sequentially select the at least one buffer included in the selection target.

2. The vehicle image processing device according to claim 1,
wherein the processor is configured to set the selection frequency of the other buffers to zero.

3. The vehicle image processing device according to claim 1, further comprising:
a capture unit having the buffers and the transfer controller provided therein;
a work buffer configured to hold the piece of image data output by the transfer controller to the signal line and subjected to the image processing performed by the processor; and
a processor unit having the processor and the work buffer provided therein,
wherein the signal line is configured to be able to connect the buffers in the capture unit and the work buffer in the processor unit to each other.

4. The vehicle image processing device according to claim 1,
wherein the state information includes a vehicle speed, and
the processor performs the selection of the buffer based on comparison of the vehicle speed and threshold values.

5. The vehicle image processing device according to claim 4,
wherein the cameras include one or more of the cameras shooting a surrounding of the vehicle,
the threshold values include a first threshold value and
when the vehicle speed is less than the first threshold value, the processor selects the buffer in which the piece of image data shot with the one or more of the cameras shooting the entire surrounding of the vehicle is accumulated.

6. The vehicle image processing device according to claim 4,
wherein the cameras include a camera shooting an area ahead of the vehicle and a camera shooting an area behind the vehicle,
the state information further includes a shift position of a gear of the vehicle,
the threshold values include the first threshold value and a second threshold value which is more than the first threshold value and
when the vehicle speed is equal to or more than the first threshold value and less than the second threshold value, and the shift position indicates a forward movement, the processor selects only the buffer in which the piece of image data shot with the camera shooting the area ahead of the vehicle is accumulated whereas when the shift position indicates a backward movement, the processor selects only the buffer in which the piece of image data shot with the camera shooting the area behind the vehicle is accumulated.

7. The vehicle image processing device according to claim 4,
wherein the cameras include a far-field camera which shoots a far-field area in a direction of travelling of the vehicle and a near-field camera which shoots a near-field area in the direction of travelling of the vehicle and which has a wider angle of view than the far-field camera,
the threshold values include a second threshold value and
when the vehicle speed is equal to or more than the second threshold value, the processor selects the buffer in which the piece of image data shot with the far-field camera is accumulated whereas when the vehicle speed is less than the second threshold value, the processor selects the buffer in which the piece of image data shot with the near-field camera is accumulated.

8. The vehicle image processing device according to claim 4,
wherein the threshold values include a switching start threshold value and a switching completion threshold value in which a difference with the switching start threshold value is a first value,
the processor is configured to perform the image processing on a predetermined number of pieces of the image data per unit time and
when the vehicle speed is between the switching start threshold value and the switching completion threshold value, the processor switches the buffers to be selected such that, as the vehicle speed approaches the switching completion threshold value from the switching start threshold value, the predetermined number of pieces of image data on which the image processing is performed per the unit time before the vehicle speed reaches the switching start threshold value is replaced with the predetermined number of pieces of image data after the vehicle speed reaches the switching completion threshold value.

9. The vehicle image processing device according to claim 8,
wherein when the vehicle speed reaches the switching start threshold value, the processor first switches the camera corresponding to the buffer which needs to be selected when the vehicle speed reaches the switching completion threshold value and the buffer corresponding to the camera which is least associated with a direction of shooting.

10. The vehicle image processing device according to claim 1, further comprising:
an acquisition portion acquiring characteristic information including an instruction for a monitoring direction in a specific place,
wherein the processor selects at least one of the buffers based on a position of travelling and the characteristic information.

11. The vehicle image processing device according to claim 1,
wherein the vehicle is an industrial vehicle,
the state information includes the vehicle speed and a steering angle,
the processor determines, based on the state information, whether turning of the vehicle is rightward turning or leftward turning and
when the vehicle is turned rightward, the processor selects the buffer in which the piece of image data obtained by shooting at least an area on a right side in a forward direction and an area on a left side in a backward direction with respect to the direction of travelling is accumulated whereas when the vehicle is turned leftward, the processor selects the buffer in which the piece of image data obtained by shooting at least an area on the left side in the forward direction and an area on the right side in the backward direction with respect to the direction of travelling is accumulated.

12. The vehicle image processing device according to claim 11,
wherein the cameras include a right-side shooting camera shooting an area on the right side of the vehicle and a left-side shooting camera shooting an area on the left side thereof, and
when the vehicle is turned rightward, the processor performs the image processing on a region of part on a left side of the pieces of image data individually shot with the right-side shooting camera and the left-side shooting camera whereas when the vehicle is turned leftward, the processor performs the image processing on a region of part on a right side of the pieces of image data individually shot with the right-side shooting camera and the left-side shooting camera.

13. The vehicle image processing device according to claim 1,
wherein the state information includes the steering angle and the shift position of the gear of the vehicle, and
the processor estimates, based on the steering angle and the shift position, a route on which the vehicle travels, and performs, based on a result of the estimation, the image processing on a region of part included in the pieces of image data acquired from the buffers.

14. The vehicle image processing device according to claim 1,
wherein the cameras include a first camera shooting an area in a first direction of the vehicle and a second camera shooting an area in a direction different from the first direction, and
the vehicle image processing device further comprises an adjustment portion adjusting, based on brightness of the pieces of image data individually shot with the first camera and the second camera, a shooting parameter for each of the cameras.

15. A vehicle image processing method performed by a processor of a computer, the computer comprising:
a plurality of buffers configured to accumulate pieces of image data input individually and sequentially from a plurality of cameras installed in a vehicle so as to associate the pieces of image data with the cameras;
the processor configured to select the buffer based on state information of the vehicle including a vehicle speed and acquire the piece of image data from the selected buffer so as to perform image processing thereon;
a signal line transferring the pieces of image data in the buffers to the processor; and
a transfer controller configured to output the piece of image data in the buffer required from the processor to the signal line,
wherein the vehicle image processing method comprises a step of performing the selection of the buffer based on comparison of the vehicle speed and threshold values, and
wherein the processor is configured to determine, based on the state information, at least one buffer among the plurality of buffers as a selection target, and set a selection frequency of the at least one buffer included in the selection target higher than selection frequencies of the other buffers so as to sequentially select the at least one buffer included in the selection target.

16. The vehicle image processing device according to claim 15,
wherein the processor is configured to set the selection frequency of the other buffers to zero.

17. A computer-readable storage medium storing a vehicle image processing program instructing a processor of a computer to perform a step of performing selection of a buffer based on comparison of a vehicle speed and threshold values, the computer comprising:
a plurality of buffers configured to accumulate pieces of image data input individually and sequentially from a plurality of cameras installed in a vehicle so as to associate the pieces of image data with the cameras;
the processor configured to select the buffer based on state information of the vehicle including the vehicle speed and acquire the piece of image data from the selected buffer so as to perform image processing thereon;
a signal line transferring the pieces of image data in the buffers to the processor; and
a transfer controller configured to output the piece of image data in the buffer required from the processor to the signal line,
wherein the processor is configured to determine, based on the state information, at least one buffer among the plurality of buffers as a selection target, and set a selection frequency of the at least one buffer included in the selection target higher than selection frequencies of the other buffers so as to sequentially select the at least one buffer included in the selection target.

18. The vehicle image processing device according to claim 17
wherein the processor is configured to set the selection frequency of the other buffers to zero.

* * * * *